United States Patent
Zoonens et al.

(10) Patent No.: US 12,534,550 B2
(45) Date of Patent: Jan. 27, 2026

(54) AMPHIPOLS

(71) Applicants: CENTRE NATIONAL DE LA RECHERCHE SCIENTIFIQUE, Paris (FR); UNIVERSITE DE PARIS, Paris (FR)

(72) Inventors: Manuela Zoonens, Paris (FR); Anaïs Marconnet, Paris (FR); Fabrice Giusti, Tavel (FR)

(73) Assignees: UNIVERSITE DE PARIS, Paris (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 1054 days.

(21) Appl. No.: 17/298,328

(22) PCT Filed: Dec. 3, 2019

(86) PCT No.: PCT/EP2019/083563
§ 371 (c)(1),
(2) Date: May 28, 2021

(87) PCT Pub. No.: WO2020/115083
PCT Pub. Date: Jun. 11, 2020

(65) Prior Publication Data
US 2022/0119558 A1    Apr. 21, 2022

(30) Foreign Application Priority Data

Dec. 3, 2018   (EP) .................................. 18306606

(51) Int. Cl.
$C08F\ 20/56$   (2006.01)
$C08F\ 220/06$  (2006.01)
$G01N\ 33/68$   (2006.01)

(52) U.S. Cl.
CPC ......... $C08F\ 20/56$ (2013.01); $G01N\ 33/6803$ (2013.01); $C08F\ 220/06$ (2013.01)

(58) Field of Classification Search
CPC .... C08F 220/54; C08F 220/56; C08F 220/06; C08F 120/06; C08F 8/44; G01N 33/6803; C08L 33/02; C08L 33/24
See application file for complete search history.

(56) References Cited

U.S. PATENT DOCUMENTS 4,921,903 A    5/1990   Fong

FOREIGN PATENT DOCUMENTS

| JP | H04138449 A | 5/1992 |
| JP | 2003262728 A | 9/2003 |
| WO | 1997008217 A1 | 3/1997 |
| WO | 1998027434 | 6/1998 |
| WO | 2011004158 A1 | 1/2011 |

OTHER PUBLICATIONS

Tribet, C. et al. Langmuir vol. 13 pp. 5570-5576 (Year: 1997).*
Orwick-Rydmark, et al. "Detergent-free incorporation of a seven-transmembrane receptor protein into nanosized bilayer Lipodisq particles for functional and biophysical studies." Nano Letters. vol. 12. 2012. pp. 4687-4692.
Gohon, et al. "Well-defined nanoparticles formed by hydrophobic assembly of a short and polydisperse random terpolymer, amphipol A8-35." Langmuir. vol. 22. 2006. pp. 1281-1290.
Knowles, et al. "Membrane proteins solubilized intact in lipid containing nanoparticles bounded by styrene maleic acid copolymer." Journal of American Chemical Society. vol. 131. 2009. pp. 7484-7485.
Oesterhelt, et al. "Rhodopsin-like Protein from the Purple Membrane of Halobacterium halobium." Nature New Biology. vol. 233, 1971. pp. 149-152.
Pierre, et al. "Purification and characterization of the cytochrome b6 f complex from Chlamydomonas reinhardtii." The Journal of Biological Chemistry. vol. 270, No. 49. 1995, pp. 29342-29349.
Champeil, et al. "Interaction of Magnesium and Inorganic Phosphate with Calcium-Deprived Sarcoplasmic Reticulum Adenosinetriphosphatase As Reflected by Organic Solvent Induced Perturbation." Biochemistry. vol. 24. 1985. pp. 69-81.
International Search Report and Written Opinion in PCT/EP2019/083563 dated Jun. 9, 2020, 12 pages.
Tominey, et al. "RAFT polymers for protein recognition." Beilstein Journal of Organic Chemistry. 2010. vol. 6. No. 66. 8 pages.
Vial, et al. "Rate of Permeabilization of Giant Vesicles by Amphiphilic Polyacrylates Compared to the Adsorption of These Polymers onto Large Vesicles and Tethered Lipid Bilayers." Langmuir, 2009, vol. 25, No. 13. pp. 7506-7513.
Ji, et al. "The relationships between rheological rules and cohesive energy amphiphilic polymers with different hydrophobic groups." Journal of Polymer Research. 2015. vol. 22, No. 3., pp. 1-7.
Tribet, et al. "Amphipols: Polymers that keep membrane proteins soluble in aqueous solutions." Proceedings of the National Academy of Sciences of the United States of America. Dec. 24, 1996. vol. 93., No. 26, pp. 15047-15050.
Le Bon, et al. "Labeling and Functionalizing Ampiphols for Biological Applications." The Journal of Membrane Biology. Apr. 2014, vol. 247, No. 9, pp. 797-814.

(Continued)

Primary Examiner — Jeffrey S Lenihan
(74) Attorney, Agent, or Firm — Steven J. Solomon

(57) ABSTRACT

The invention relates to polymeric compounds of formula I

Figure 1:
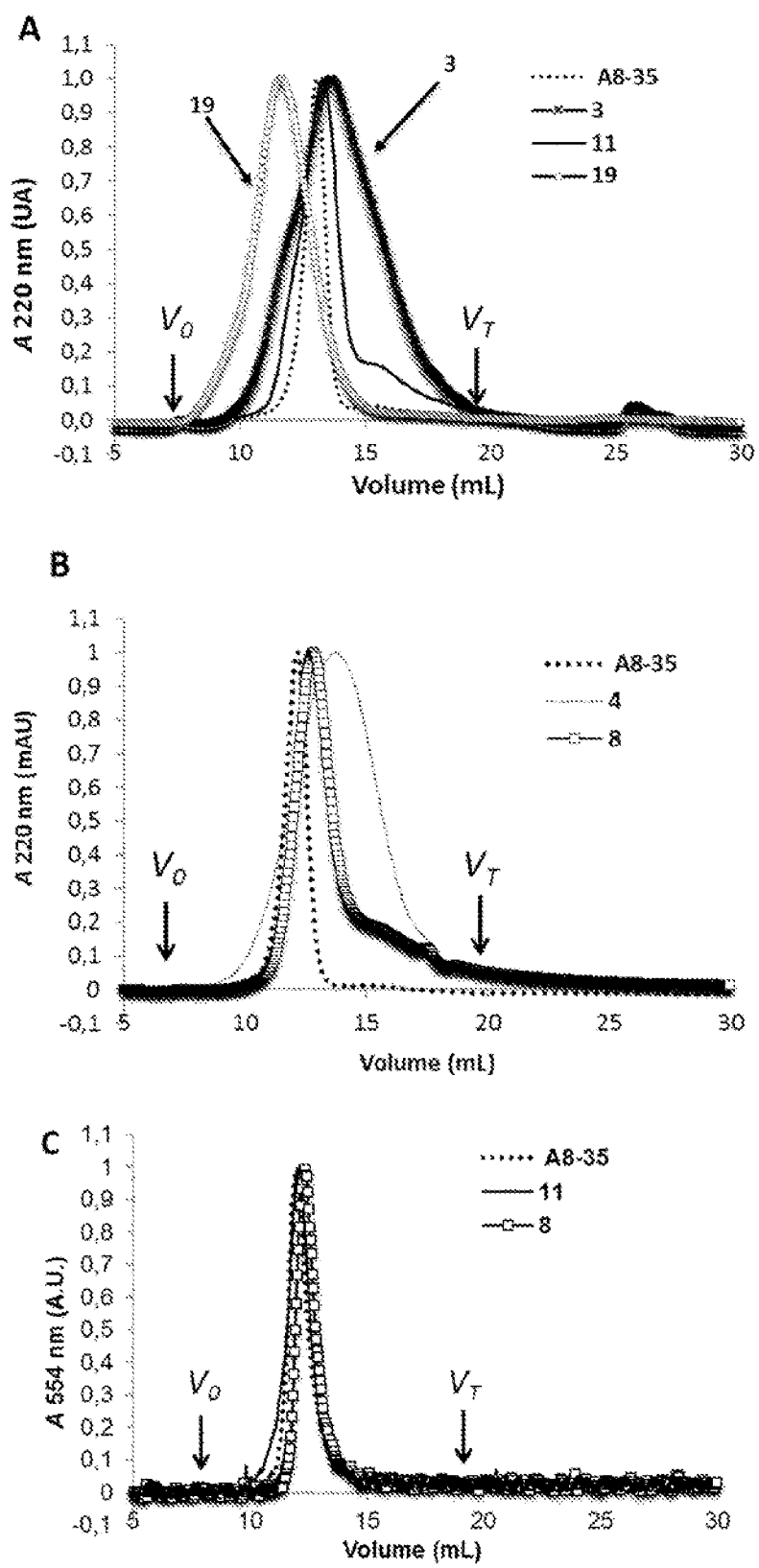

Formula I which allow the solubilization and/or stabilization of membrane proteins, it relates in particular to the complexes they form with membrane proteins and the method of solubilizing and/or stabilizing membrane proteins comprising the use of these compounds.

21 Claims, 7 Drawing Sheets

(56) References Cited

OTHER PUBLICATIONS

Angius, et al. "A novel regulation mechanism of the T7 RNA polymerase based expression system improves overproduction and folding of membrane proteins." 2018. Sci Rep. vol. 8. 12 pages.

Champeil, et al. "Interaction of amphipols with the sarcoplasmic reticulum Ca2+-ATPase." Journal of Biological Chemistry. Jul. 2000. vol. 275, pp. 18623-18637.

Drew, et al. "GFP-based optimization scheme for the overexpression and purification of eukaryotic membrane proteins in *Saccharomyces cerevisiae*." Nature Protocol. Feb. 2008. vol. 3. pp. 784-798.

Giusti, et al. "Synthesis, characterization and applications of a perdeuterated amphipol." The Journal of Membrane Biology. Mar. 2014. vol. 247. pp. 909-924.

Laemmli, U. K. "Cleavage of structural proteins during the assembly of the head of bacteriophage T4." 1970. Nature vol. 227, pp. 680-685.

Zoonens, et al. "Amphipols for each season." Journal of Membr. Biol. 2014, vol. 247. pp. 759-796.

Sobel, et al. "Large-scale purification of the acetylcholine-receptor protein in its membrane-bound and detergent-extracted forms from Torpedo marmorata electric organ." 1977. Eur. J. Biochem. vol. 80, pp. 215-224.

\* cited by examiner

A

B

AMPHIPOLS

The invention relates to novel amphiphilic polymers called "amphipols".

These amphipathic polymers are known in the state of the art to allow the stabilization of membrane proteins in an aqueous solution once they have been extracted from the membranes via detergent use.

Membrane proteins account for about 30% of the proteins encoded by the cell genome and are involved in many important cellular functions (signaling, secretion, migration, adhesion, homeostasis, energy production, etc.). Membrane proteins can be monomeric or oligomeric. Due to their integration in membranes, they are highly structured into a helices or β-sheets for the transmembrane parts interacting with the alkyl chains of membrane lipids.

The numerous functions and enzymatic activities they assume make them pharmacological targets or biotechnological tools of choice. However, their functional and structural study in solution and their use in the development of therapeutic or biotechnological tools imply their production in large quantities, their purification, and their maintenance in an active conformation, and yet these are usually unstable once extracted from the membrane. This instability in an aqueous solution is notable due to the need for surfactants to prevent their aggregation. Indeed, the surface of the extramembrane domains of these proteins is mainly covered with amino acids with hydrophilic side chains while the surface of their transmembrane domain is covered with amino acids with hydrophobic chains; the membrane proteins are thus highly insoluble in water due to the hydrophobic effect which urges them to aggregate in solution in order to minimize the disruption of the hydrogen bonding network between the water molecules.

There are many strategies to produce membrane proteins in sufficient quantities, as well as a large choice of chemical molecules for their purification (with the yields being often limited), solubilization, and stabilization in an aqueous solution.

The detergents available on the market allow the proteins to be solubilized but, as mentioned, cause their more or less rapid denaturation and inactivation, in particular because of the dissociating power of the detergents; moreover, it is necessary to maintain them in solution at concentrations above their critical micelle concentration (CMC). On the other hand, surfactants such as amphipols (WO 98/27434) allow proteins to be stabilized but offer much lower solubilization properties. Amphipols are amphiphilic polymers defined as being able to keep membrane proteins in their native, soluble conformation in the form of small complexes (Zoonens & Popot, 2014). The most commonly used and studied amphipol is A8-35. It consists of a polyacrylic acid backbone onto which octylamine and isopropylamine side chains are grafted: 35% ungrafted carboxylic acid groups, 25% carboxylic derivatives grafted with octyl chains (octylamine), and 40% carboxylic groups grafted with isopropyl groups (isopropylamine). Type A8-35 amphipols generally require prior solubilization of the membranes using a detergent, subsequently replaced by the amphipol by means of dilution of the detergent under its CMC (which has the disadvantage of also diluting the proteins) or its adsorption onto beads. Other amphiphilic polymers have been developed. Among these can be mentioned SMAs (for Styrene Maleic Acid copolymers, WO2011004158) and their derivatives which would present the particularity of being able to solubilize the membrane proteins directly from the membrane fractions, without the preliminary solubilization by means of a detergent. However, SMAs, unlike amphipols which are simply purified after their synthesis, always contain impurities which preclude the subsequent use of the proteins for biotechnological applications.

The strategies for purifying proteins and in particular membrane proteins, whether recombinant or not, are generally empirical and difficult to predict, depending in particular on the protein, the (micro)organism, or the composition of the membrane; successive trials of different agents to solubilize and/or stabilize the membrane proteins are generally carried out in order to identify the most effective agent under these conditions.

In this context, the provision of novel alternative tools for the production of membrane proteins of high biotechnological interest is desirable. In particular, polymers with both membrane protein solubilization and stabilization properties would be particularly advantageous and do not currently exist. The novel Amphipols which are the subject of the invention meet this need.

SUMMARY

The invention therefore aims to provide novel compounds for solubilizing and stabilizing membrane proteins. More particularly, the invention relates to novel amphipols, amphiphilic vinyl polymers having improved solubilization properties while allowing satisfactory stabilization of membrane proteins.

To this end, the invention relates to amphiphilic vinyl polymers of formula I,

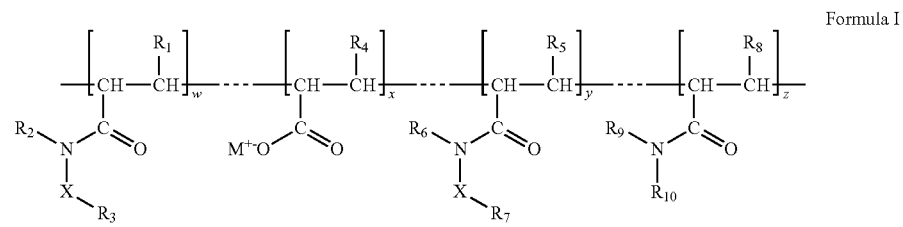

Formula I wherein:
- $M^+$ is an alkali metal, preferably selected from $Li^+$, $Na^+$, $K^+$,
- $R_1$, $R_4$, $R_5$, $R_3$ are each independently a hydrogen atom or a methyl radical,
- $R_2$, $R_5$, $R_9$ are each independently a group selected from a hydrogen atom and linear or branched (C1-C8) alkyls,
- $R_{10}$ is a group selected from linear or branched (C1-C5) alkyls,
- $R_3$ and $R_7$ are each independently a group selected from: hydrogen, with X then being a single bond, linear or branched alkyls of at least 6 carbon atoms, linear or branched alkenyls of at least 6 carbon atoms, or linear or branched alkynyls of at least 6 carbon atoms, with X then being a single bond, (C3-C10) cycloalkyls or (C3-C10) (hetero)cycloalkyls, unsubstituted or substituted by one or more radicals selected from linear, cyclic or branched (C1-C8) alkyls, linear or branched (C1-C8) alkenyls, and linear or branched (C1-C8) alkynyls, with X then being a single bond, or selected from linear or branched (C1-C8) alkylenes, linear or branched (C1-C8) alkenyls, and linear or branched (C1-C8) alkynyls, (C3-C10) cycloalkenyls or (C3-C10) (hetero)cycloalkenyls, poly or monounsaturated, unsubstituted or substituted by one or more radicals selected from linear, cyclic or branched (C1-C8) alkyls, linear or branched (C1-C8) alkenyls, linear or branched (C1-C8) alkynyls, with X then being a single bond, or selected from linear or branched (C1-C8) alkylenes, linear or branched (C2-C8) alkenylenes, and linear or branched (C2-C8) alkynylenes, poly or monounsaturated polycycles, unsubstituted or substituted by one or more radicals selected from linear, cyclic or branched (C1-C8) alkyls, linear or branched (C1-C8) alkenyls, linear or branched (C1-C8) alkynyls, with X then being a single bond, or selected from linear or branched (C1-C8) alkylenes, linear or branched (C2-C8) alkenylenes, and linear or branched (C2-C8) alkynylenes, phenyl, unsubstituted or substituted by one or more radicals selected from linear, cyclic or branched (C1-C8) alkyls, linear or branched (C1-C8) alkenyls, linear or branched (C1-C8) alkynyls, with X being a single bond, or being then selected from linear or branched (C1-C8) alkylenes, linear or branched (C2-C8) alkenylenes, and linear or branched (C2-C8) alkynylenes, provided that when one of the groups $R_3$ or $R_7$ is a linear or branched alkyl of at least 6 carbon atoms, a linear or branched alkenyl of at least 6 carbon atoms, or a linear or branched alkynyls of at least 6 carbon atoms, or a hydrogen atom, with X then being a single bond, then the other group $R_3$ or $R_7$ is selected from:

(C3-C10) cycloalkyls or (C3-C10) (hetero)cycloalkyls, unsubstituted or substituted by one or more radicals selected from linear, cyclic or branched (C1-C8) alkyls, linear or branched (C1-C8) alkenyls, and linear or branched (C1-C8) alkynyls, with X then being a single bond, or selected from linear or branched (C1-C8) alkylenes, linear or branched (C2-C8) alkenylenes, and linear or branched (C2-C8) alkynylenes, (C3-C10) cycloalkenyls or (C3-C10) (hetero)cycloalkenyls, poly or monounsaturated, unsubstituted or substituted by one or more radicals selected from linear, cyclic or branched (C1-C8) alkyls, linear or branched (C1-C8) alkenyls, linear or branched (C1-C8) alkynyls, with X then being a single bond, or selected from linear or branched (C1-C8) alkylenes, linear or branched (C2-C8) alkenylenes, and linear or branched (C2-C8) alkynylenes, poly or monounsaturated polycycles, unsubstituted or substituted by one or more radicals selected from linear, cyclic or branched (C1-C8) alkyls, linear or branched (C1-C8) alkenyls, linear or branched (C1-C8) alkynyls, with X then being a single bond, or selected from linear or branched (C1-C8) alkylenes, linear or branched (C2-C8) alkenylenes, and linear or branched (C2-C8) alkynylenes, and phenyl, unsubstituted or substituted by one or more radicals selected from linear, cyclic or branched (C1-C8) alkyls, linear or branched (C1-C8) alkenyls, linear or branched (C1-C8) alkynyls, with X then being a single bond, or selected from linear or branched (C1-C8) alkylenes, linear or branched (C2-C8) alkenylenes, and linear or branched (C2-C8) alkynylenes, with w, x, y, z corresponding to the respective percentages of the units, with x being between 20 and 90%, with y being between 0 and 80%, with w being between 0 and 80%, and with z being between 0 and 60%, provided that w+x+y+z=100%, and that y or w is at least 10%.

According to an optional feature, the amphiphilic vinyl polymer of formula I is such that w=0 and $R_7$ is a group selected from:

(C3-C10) cycloalkyls or (C3-C10) (hetero)cycloalkyls, unsubstituted or substituted by one or more radicals selected from linear, cyclic or branched (C1-C8) alkyls, linear or branched (C1-C8) alkenyls, and linear or branched (C1-C8) alkynyls, or phenyl, unsubstituted or substituted by one or more radicals selected from linear, cyclic or branched (C1-C8) alkyls, linear or branched (C1-C8) alkenyls, linear or branched (C1-C8) alkynyls, with X then being a single bond, or selected from linear or branched (C1-C8) alkylenes, linear or branched (C2-C8) alkenylenes, and linear or branched (C2-C8) alkynylenes.

According to other optional features, the amphiphilic vinyl polymer of formula I is such that:

$R_3$ and/or $R_7$ are (C6-C8) cycloalkyls as previously specified, or $R_3$ and/or $R_7$ are phenyl, preferably said phenyl is para-substituted with a methyl or ethyl group, with X being a single bond, or selected from linear or branched (C1-C8) alkylenes, linear or branched (C2-C8) alkenylenes, and linear or branched (C2-C8) alkynylenes.

According to other optional features, the amphiphilic vinyl polymer of formula I is such that:

$R_3$ and/or $R_7$ are (C6-C8) cycloalkyls as previously specified, with X being preferably a single bond or CH2, $R_3$ and/or $R_7$ are phenyl, preferably said phenyl is para-substituted with a methyl or ethyl group, with X being a single bond, or $R_3$ and/or $R_7$ are a styrenyl group, with X being a single bond.

According to other optional features, the amphiphilic vinyl polymer of formula I is such that:

the metal M is Na$^+$, $R_{10}$ is an isopropyl group, x is less than or equal to 75%, w and/or y is greater than or equal to 25%, w and/or y is between 25% and 50%, and z is between 0% and 40%, preferably between 15% and 40%, or it is functionalized by grafting an affinity tag, a fluorescent probe, or an immunostimulatory molecule.

According to another optional feature, the vinyl polymer of formula I is such that:

$R_1$, $R_2$, $R_4$, $R_5$, $R_6$, $R_8$, $R_9$ are a hydrogen atom, $R_3$ and/or $R_7$ is ($C_6$-$C_8$) cycloalkyl and X is a single bond, $R_{10}$ is an isopropyl group, x is equal to 35% or 50%, y is greater than or equal to 25%, w is equal to 0%, or 25%, and z is equal to 0%, 15% or 40%, provided that w+x+y+z=100%.

According to another optional feature, the vinyl polymer of formula I is selected from the compounds listed in Table 1.

The vinyl polymers of the invention are amphipols, that is to say they are capable of keeping membrane proteins soluble in their native conformation, in the form of small complexes. Thus, in another aspect, the invention relates to the water-soluble complex formed by i) a membrane protein or a mixture of membrane proteins and ii) at least one amphiphilic vinyl polymer compound, as described above.

According to an optional feature, the water-soluble complex thus formed is such that it further comprises lipid compounds.

In addition, the polymers of the invention allow the membrane proteins to be stabilized in an aqueous solution. Thus, an object of the invention is the water-soluble complex formed by i) a membrane protein or a mixture of membrane proteins and ii) at least one amphiphilic vinyl polymer compound of the invention within which the membrane proteins are stabilized in an aqueous solution. Another object of the invention is therefore a solution comprising such a complex.

The invention also relates to a method of preparing an aqueous solution of membrane protein(s), said method comprising a solubilization and/or stabilization step in which the protein fraction from a biological or synthetic membrane containing said membrane protein, or said mixture of membrane proteins, is brought together with the vinyl polymer as described above.

According to optional features, this method is such that:
the one or more membrane proteins are recombinant proteins expressed in prokaryotic or eukaryotic cells, and/or native proteins expressed in specialized membranes with high protein density, a step of solubilizing said membrane protein or said mixture of membrane proteins is previously carried out by means of a detergent medium, a step of fusing the protein fraction containing said membrane protein, or said mixture of membrane proteins, is previously carried out by means of vesicles of phospholipids or of mixture of phospholipids, preferably 1,2-dimyristoyl-sn-glycero-3-phosphocholine (DMPC), or the protein fraction solution containing said membrane protein is not a solution of membrane protein(s) in a detergent medium in micellar form.

The membrane protein-amphipol complexes of the invention, by allowing the solubilization and stabilization of these proteins in their native form, allow biotechnological applications of these proteins. Thus, it is also an object of the present invention to use the complexes of the invention as reagents in reagent kits, and in particular a diagnostic kit comprising at least one complex of the invention as an immunological reagent. Also, the complexes of the invention may be attached to a device making use of the activity of said membrane protein thus purified and solubilized by the amphipols of the invention for diagnostic or activity measurement purposes.

Other advantages and features of the invention will appear upon reading the following description given by way of an illustrative and non-limiting example, with reference to the appended figures which represent:

FIG. 1: Steric exclusion chromatographic analysis of the particles formed by the amphipols of the invention, A8-35, as well as their complex with bacteriorhodopsin (BR). $V_0$=dead volume; $V_T$=total volume.

Figure 2:
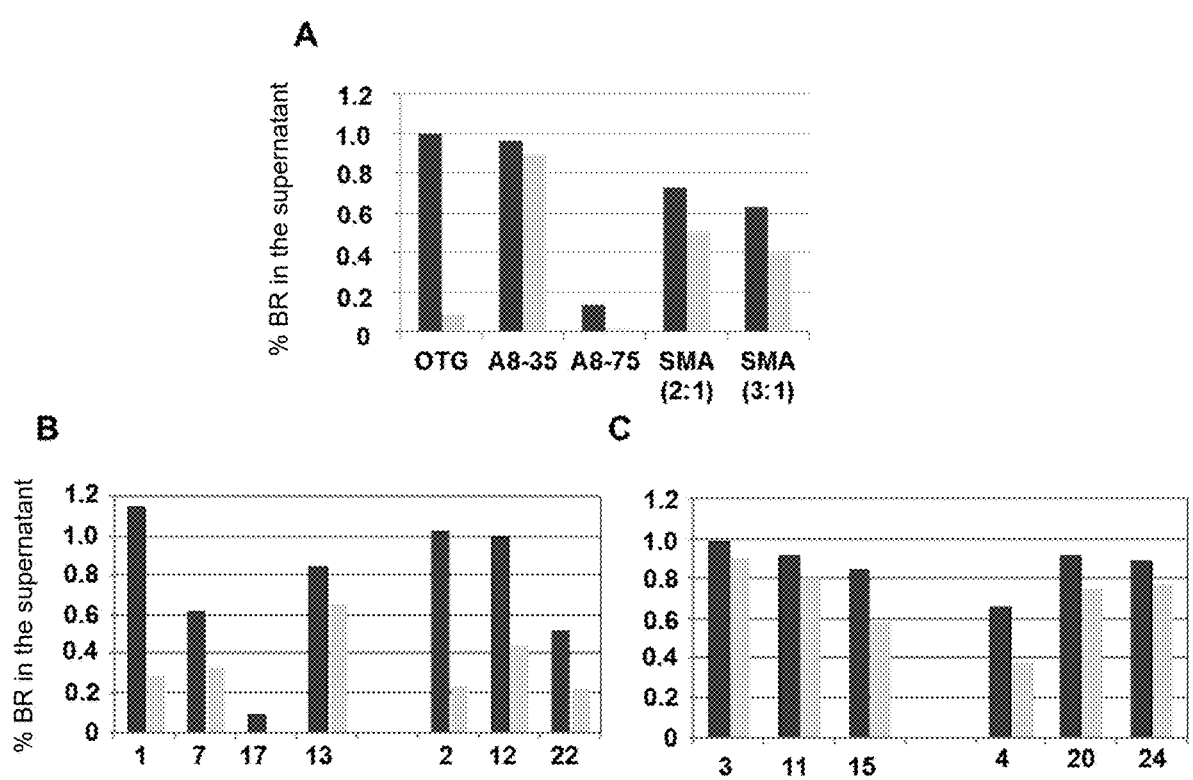

FIG. 2: Complexation of BR with amphipols according to the invention, before centrifugation (black bars) or after centrifugation (gray bars).

Figure 3:
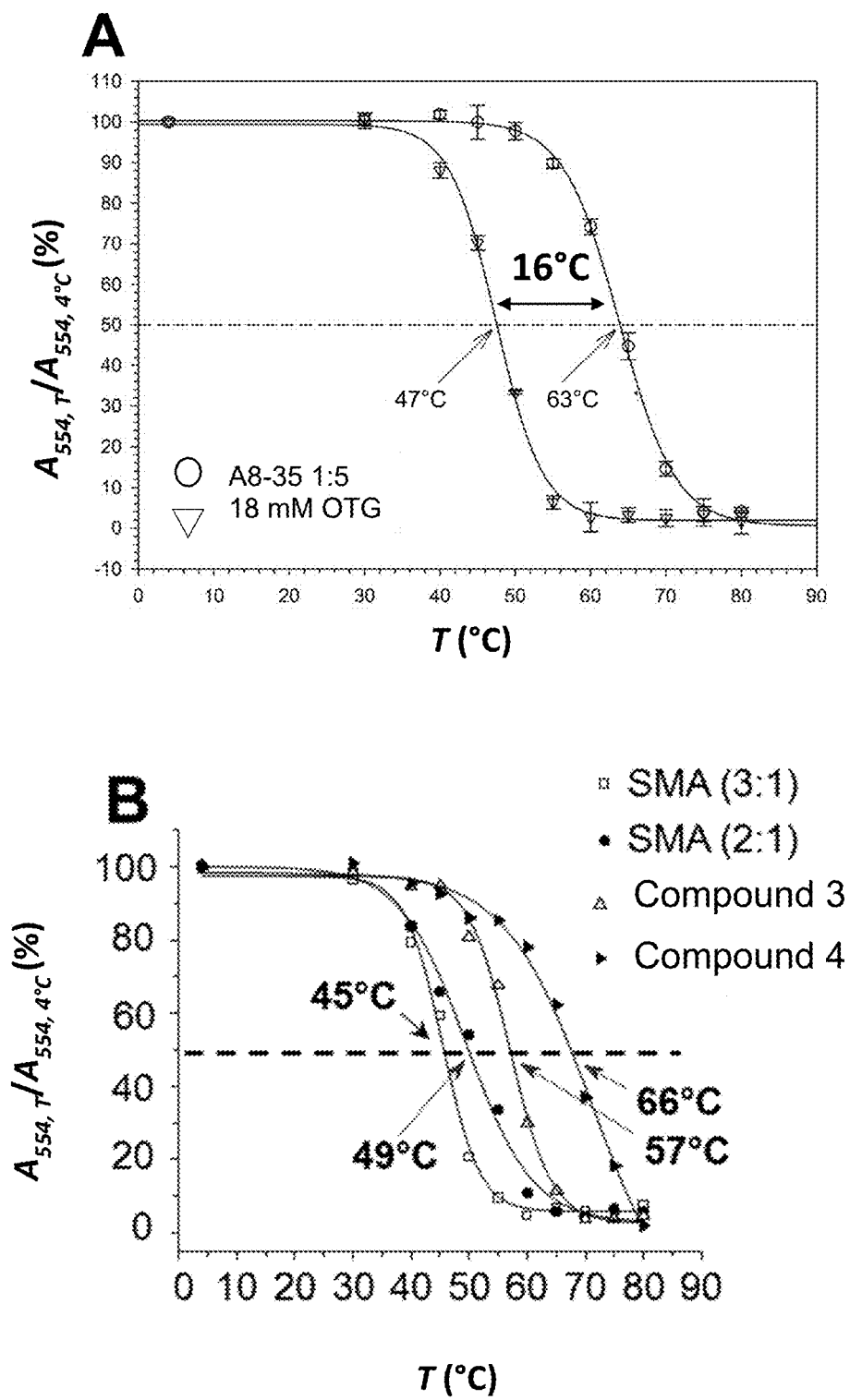

FIG. 3: Thermal denaturation of BR in different environments.

Figure 4:
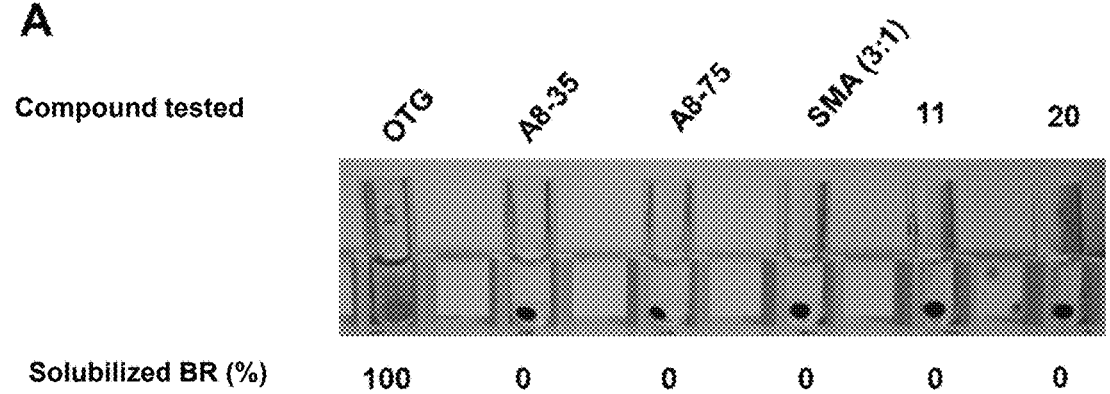
Figure 4:
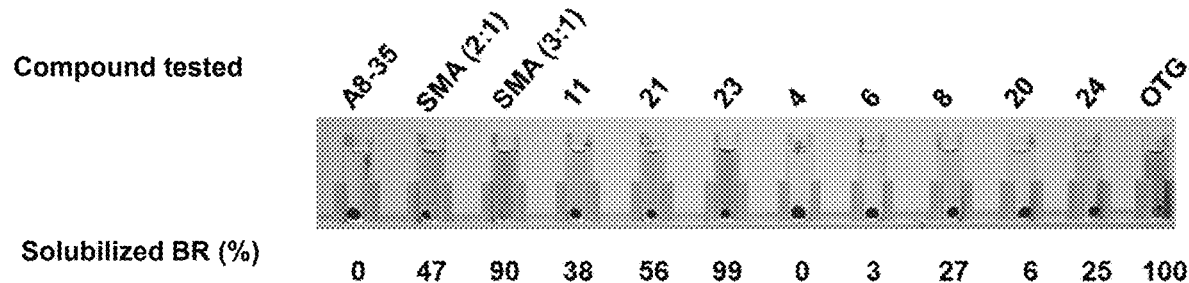

FIG. 4: Solubilization of the purple membrane of *Halobacterium salinarum* before (A) or after (B) fusion with DMPC vesicles with A8-35, SMAs, or amphipols of the invention.

Figure 5:
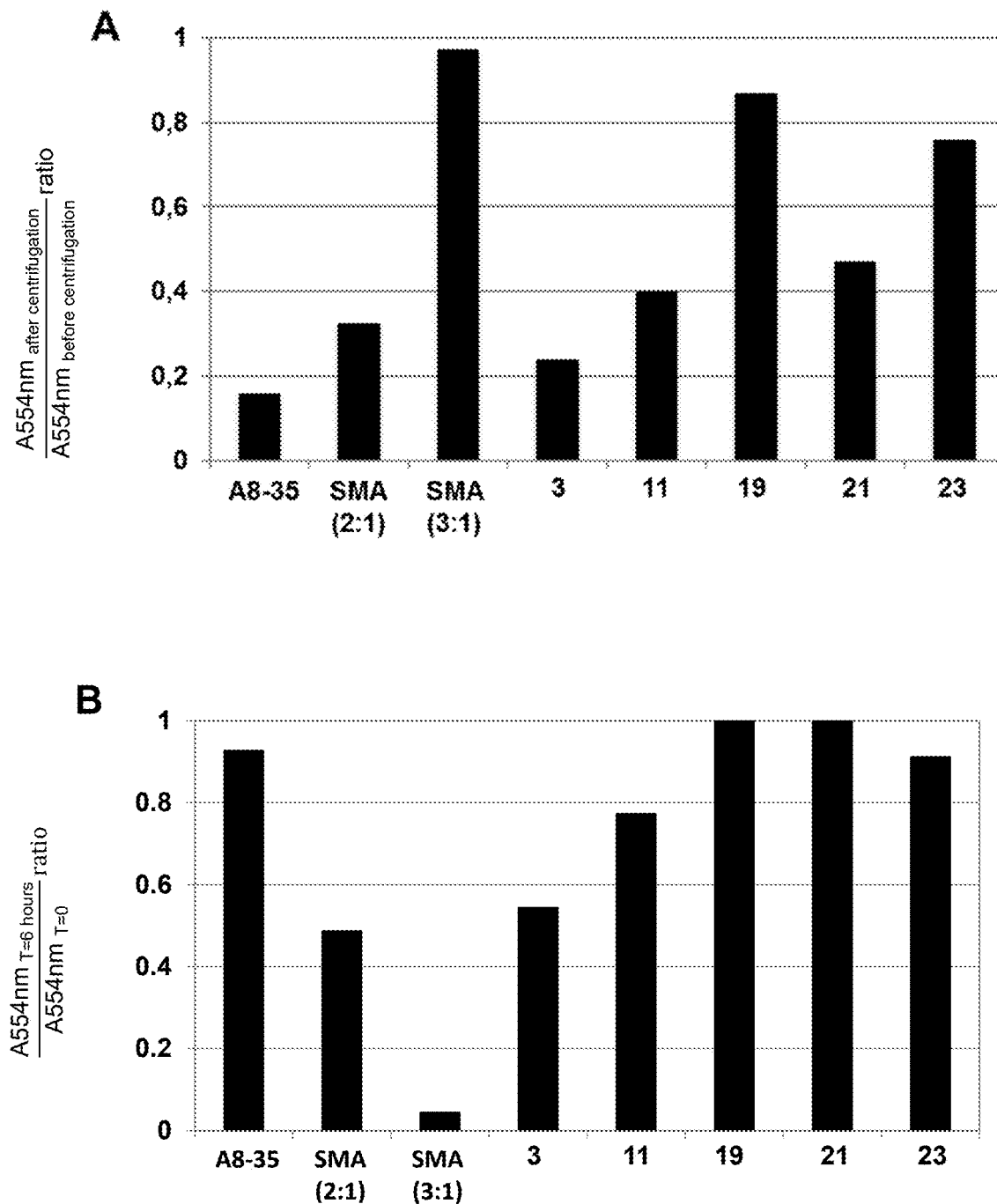

FIG. 5: Quantification of BR extracted from the purple membrane, previously fused to DMPC vesicles, by A8-35, SMAs, or polymers of the invention (A), and analysis of the thermal stability of these complexes after 6 hours incubation at 50° C. (B). The ratios of absorbance values measured at the beginning and end of each experiment are reported.

Figure 6:
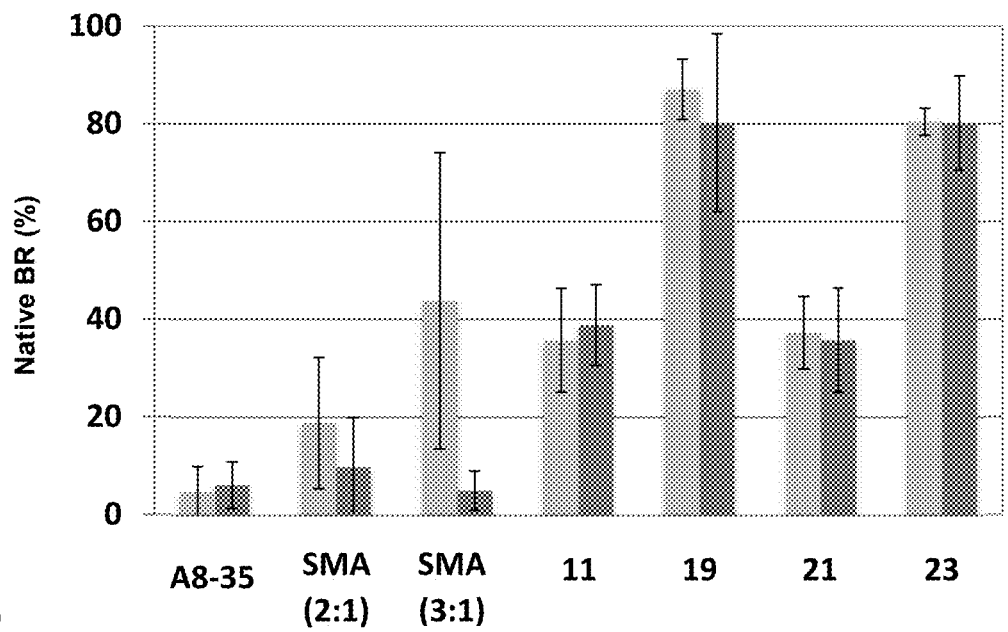
Figure 6:
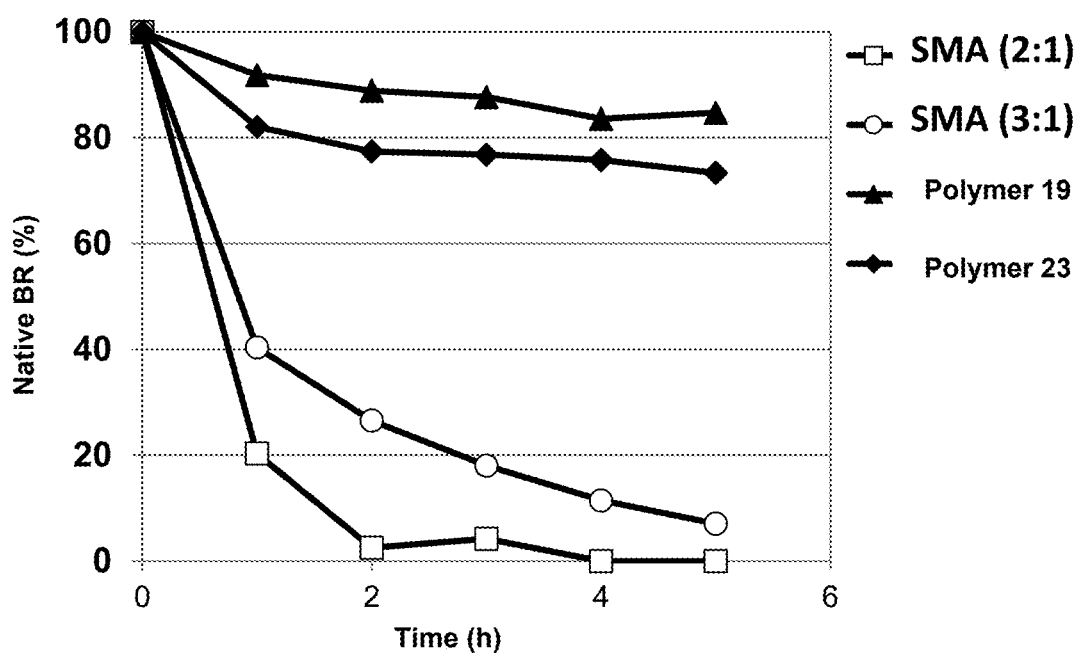

FIG. 6: Extraction of the purple membrane. (A) Quantification of the solubilization (gray bars) and thermal stability (black bars) of BR of the purple membrane, previously fused to DMPC vesicles, by A8-35, SMAs, or polymers of the invention, with each condition performed at least in triplicate+/−SD values; (B). Thermal destabilization kinetics of complexes formed with SMAs or polymers 19 and 23 over 6 hours of incubation at 50° C. The absorbance values measured at 554 nm were normalized with those measured before incubation of the samples.

Figure 7:
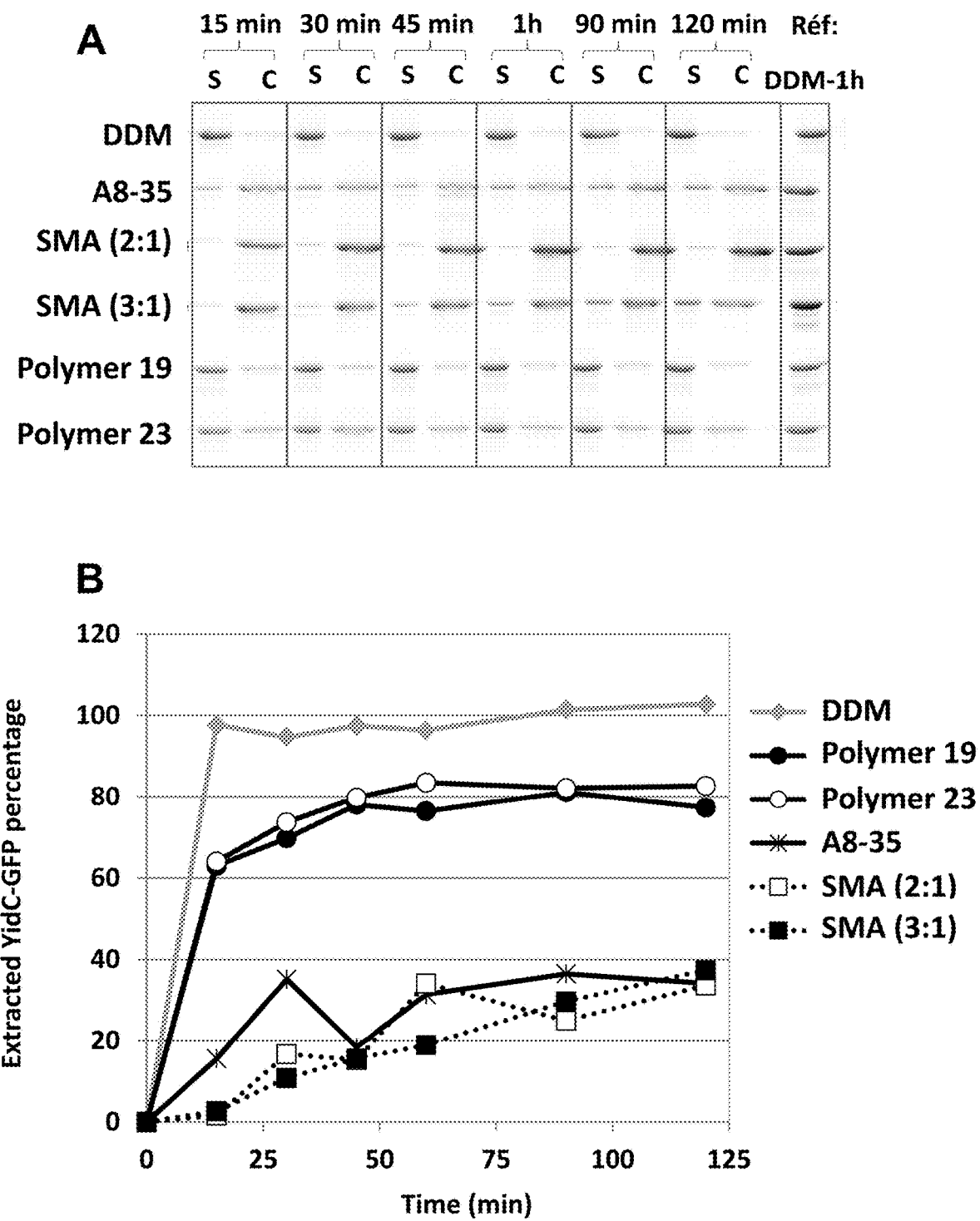

FIG. 7: Solubilization kinetics of the YidC-GFP protein overexpressed in the plasma membrane of *Escherichia coli* in the presence of SMAs, polymers of the invention, or DDM. (A) Photographs of electrophoresis gels revealing fluorescence of GFP fused to the YidC membrane protein and (B) graphical representation of fluorescence quantification from the image of the gels taking as reference the fluorescence measured in the presence of DDM after 1 hour of incubation.

FIG. 8: Solubilization of AChR-rich membranes of Torpedo marmorata with A8-35, SMAs, and amphipols of the invention. Samples corresponding to the supernatants (S) and pellets (C) of each condition were plated on acrylamide gel, which after migration was stained with Coomassie blue. Arrows indicate the location of bands corresponding to AchR subunits and the $Na^+/K^+$ ATPase of Torpedo marmorata. The proteins present in the pellets are not solubilized, the proteins in the supernatant correspond to solubilized proteins.

DESCRIPTION OF THE INVENTION AND FURTHER EMBODIMENTS

The invention relates to novel amphipols which allow the solubilization and stabilization of membrane proteins in an aqueous medium. In particular, the novel amphipols of the invention have improved solubilization and/or stabilization properties compared to the reference polymers used to solubilize membrane proteins. The complexes thus formed with membrane proteins are particularly suitable for biotechnological applications and the study of these membrane proteins.

In the following description, the term "amphipol" refers to vinyl polymers capable of keeping membrane proteins soluble in their native conformation, in the form of small complexes.

The term "vinyl", in its general meaning, encompasses acrylic polymers.

The term "membrane protein" is used interchangeably in the singular or plural form, it encompasses mixtures of membrane proteins or preparations substantially comprising a single type of protein. Within the meaning of the invention, a membrane protein is a protein that crosses the membrane on both sides and thus comprises at least one transmembrane domain or a protein comprising at least one hydrophobic domain that interacts with the membrane. The membrane protein may be monomeric or oligomeric, associated with cofactors or not.

Within the meaning of the invention, a "stabilized" membrane protein corresponds to a solubilized membrane protein retaining a native conformation and, preferably, at least part of its biological activity, even if this activity may be transiently blocked.

The term "specialized membranes" encompasses, within the meaning of the invention, the membranes of eukaryotic organelles such as, for example, the cristae of mitochondria, the thylakoids of chloroplasts, the endoplasmic or sarcoplasmic reticulum; "specialized membrane" also encompasses membranes with a high protein density comprising at least 50% membrane proteins, whether integral or not, or even at least 60%, or at least 70% membrane proteins, such as, for example, the purple membrane of the bacterium *Halobacterium salinarum* (which may comprise up to 75% bacteriorhodopsin), with the remainder comprising lipids or other molecules.

The term "biological membrane" means, within the meaning of the invention, any lipid membrane extracted or originating from a cell or organism such as bacteria, fungi, eukaryotic cells, etc. The expression "synthetic biological membrane" means any lipid membrane reconstituted, recomposed, or modified with synthetic or naturally occurring lipids. Thus, for example, and without limitation, a synthetic membrane may correspond to a lipid membrane extracted from an organism to which one or more synthetic lipids are added, a membrane made from synthetic lipids, or a lipid membrane reconstituted from natural and or synthetic lipids mixed purposely.

The term "protein fraction" comprises, within the meaning of the invention, the cell fraction containing the membrane protein sought or analyzed. Thus, it may be a more or less clarified and/or purified cell homogenate. In the case of membrane proteins, the term "protein fraction" refers in particular to a fraction of this homogenate such as the membrane fraction or the fraction corresponding to a cell compartment.

The invention thus relates to an amphiphilic vinyl polymer of formula I:

wherein:

$M^+$ is an alkali metal, preferably selected from $Li^+$, $Na^+$, $K^+$, $R_1$, $R_4$, $R_5$, $R_8$ are each independently a hydrogen atom or a methyl radical, $R_2$, $R_6$, $R_9$ are each independently a group selected from a hydrogen atom and linear or branched (C1-C8) alkyls, $R_{10}$ is a group selected from linear or branched (C1-C5) alkyls, $R_3$ and $R_7$ are each independently a group selected from:
  hydrogen, with X then being a single bond,
  linear or branched alkyls of at least 6 carbon atoms, linear or branched alkenyls of at least 6 carbon atoms, or linear or branched alkynyls of at least 6 carbon atoms, with X then being a single bond,
  (C3-C10) cycloalkyls or (C3-C10) (hetero)cycloalkyls, unsubstituted or substituted by one or more radicals selected from linear, cyclic or branched (C1-C8) alkyls, linear or branched (C1-C8) alkenyls, and linear or branched (C1-C8) alkynyls, with X then being a single bond, or selected from linear or branched (C1-C8) alkylenes, linear or branched (C2-C8) alkenylenes, and linear or branched (C2-C8) alkynylenes,
  (C3-C10) cycloalkenyls or (C3-C10) (hetero)cycloalkenyls, poly or monounsaturated, unsubstituted or substituted by one or more radicals selected from linear, cyclic or branched (C1-C8) alkyls, linear or branched (C1-C8) alkenyls, linear or branched (C1-C8) alkynyls, with X then being a single bond, or selected from linear or branched (C1-C8) alkylenes, linear or branched (C2-C8) alkenylenes, and linear or branched (C2-C8) alkynylenes,
  poly or monounsaturated polycycles, unsubstituted or substituted by one or more radicals selected from linear, cyclic or branched (C1-C8) alkyls, linear or branched (C1-C8) alkenyls, linear or branched (C1-C8) alkynyls, with X then being a single bond, or selected from linear or branched (C1-C8) alkylenes, linear or branched (C2-C8) alkenylenes, and linear or branched (C2-C8) alkynylenes, or
  phenyl, unsubstituted or substituted by one or more radicals selected from linear, cyclic or branched (C1-C8) alkyls, linear or branched (C1-C8) alkenyls, linear or branched (C1-C8) alkynyls, with X then being a single bond, or selected from linear or branched (C1-C8) alkylenes, linear or branched (C2-C8) alkenylenes, and linear or branched (C2-C8) alkynylenes,

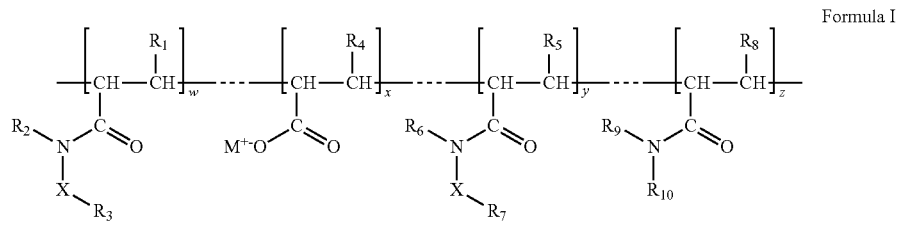

Formula I provided that when one of the groups $R_3$ or $R_7$ is a linear or branched alkyl of at least 6 carbon atoms, a linear or branched alkenyl of at least 6 carbon atoms, or a linear or branched alkynyls of at least 6 carbon atoms, or a hydrogen atom, with X being a single bond, then the other group $R_3$ or $R_7$ is selected from:
- (C3-C10) cycloalkyls or (C3-C10) (hetero)cycloalkyls, unsubstituted or substituted by one or more radicals selected from linear, cyclic or branched (C1-C8) alkyls, linear or branched (C1-C8) alkenyls, and linear or branched (C1-C8) alkynyls, with X then being a single bond, or selected from linear or branched (C1-C8) alkylenes, linear or branched (C2-C8) alkenylenes, and linear or branched (C2-C8) alkynylenes,
- (C3-C10) cycloalkenyls or (C3-C10) (hetero)cycloalkenyls, poly or monounsaturated, unsubstituted or substituted by one or more radicals selected from linear, cyclic or branched (C1-C8) alkyls, linear or branched (C1-C8) alkenyls, linear or branched (C1-C8) alkynyls, with X then being a single bond, or selected from linear or branched (C1-C8) alkylenes, linear or branched (C2-C8) alkenylenes, and linear or branched (C2-C8) alkynylenes,
- poly or monounsaturated polycycles, unsubstituted or substituted by one or more radicals selected from linear, cyclic or branched (C1-C8) alkyls, linear or branched (C1-C8) alkenyls, linear or branched (C1-C8) alkynyls, with X then being a single bond, or selected from linear or branched (C1-C8) alkylenes, linear or branched (C2-C8) alkenylenes, and linear or branched (C2-C8) alkynylenes, or
- phenyl, unsubstituted or substituted by one or more radicals selected from linear, cyclic or branched (C1-C8) alkyls, linear or branched (C1-C8) alkenyls, linear or branched (C1-C8) alkynyls, with X then being a single bond, or selected from linear or branched (C1-C8) alkylenes, linear or branched (C2-C8) alkenylenes, and linear or branched (C2-C8) alkynylenes, with w, x, y, z corresponding to the respective percentages of the units,
with x being between 20 and 90%,
with y being between 0 and 80%,
with w being between 0 and 80%, and
with z being between 0 and 60%, provided that w+x+y+z=100%, and that y or w is at least 10%.

It is obvious from the definition in the preceding paragraph that when one of the groups $R_3$ or $R_7$ is a linear or branched alkyl of at least 6 carbon atoms, a linear or branched alkenyl of at least 6 carbon atoms, or a linear or branched alkynyls of at least 6 carbon atoms, or a hydrogen atom, with X being a single bond, then, with the other group $R_3$ or $R_7$ being as specified and defined above, then w and y are different from 0.

In a particular embodiment, the polymer of formula I is such that:
- $M^+$ is an alkali metal, preferably selected from $Li^+$, $Na^+$, $K^+$,
- $R_1$, $R_4$, $R_5$, $R_3$ are each independently a hydrogen atom or a methyl radical,
- $R_2$, $R_5$, $R_9$ are each independently a group selected from a hydrogen atom and linear or branched (C1-C8) alkyls,
- $R_{10}$ is a group selected from linear or branched (C1-C5) alkyls,
- $R_3$ and/or $R_7$ are each independently a group selected from:
  - (C3-C10) cycloalkyls or (C3-C10) (hetero)cycloalkyls, unsubstituted or substituted by one or more radicals selected from linear, cyclic or branched (C1-C8) alkyls, linear or branched (C1-C8) alkenyls, and linear or branched (C1-C8) alkynyls, with X then being a single bond, or selected from linear or branched (C1-C8) alkylenes, linear or branched (C2-C8) alkenylenes, and linear or branched (C2-C8) alkynylenes,
  - (C3-C10) cycloalkenyls or (C3-C10) (hetero)cycloalkenyls, poly or monounsaturated, unsubstituted or substituted by one or more radicals selected from linear, cyclic or branched (C1-C8) alkyls, linear or branched (C1-C8) alkenyls, linear or branched (C1-C8) alkynyls, with X then being a single bond, or selected from linear or branched (C1-C8) alkylenes, linear or branched (C2-C8) alkenylenes, and linear or branched (C2-C8) alkynylenes,
  - poly or monounsaturated polycycles, unsubstituted or substituted by one or more radicals selected from linear, cyclic or branched (C1-C8) alkyls, linear or branched (C1-C8) alkenyls, linear or branched (C1-C8) alkynyls, with X then being a single bond, or selected from linear or branched (C1-C8) alkylenes, linear or branched (C2-C8) alkenylenes, and linear or branched (C2-C8) alkynylenes,
  - phenyl, unsubstituted or substituted by one or more radicals selected from linear, cyclic or branched (C1-C8) alkyls, linear or branched (C1-C8) alkenyls, linear or branched (C1-C8) alkynyls, with X being a single bond, or being then selected from linear or branched (C1-C8) alkylenes, linear or branched (C2-C8) alkenylenes, and linear or branched (C2-C8) alkynylenes, with w, x, y, z corresponding to the respective percentages of the units,
with x being between 20 and 90%,
with y being between 0 and 80%,
with w being between 0 and 80%, and
with z being between 0 and 60%, provided that w+x+y+z=100%, and that y or w is at least 10%.

In a particular embodiment, the polymer of formula I is such that:
- $M^+$ is an alkali metal, preferably selected from $Li^+$, $Na^+$, $K^+$,
- $R_1$, $R_4$, $R_5$, $R_3$ are each independently a hydrogen atom or a methyl radical,
- $R_2$, $R_5$, $R_9$ are each independently a group selected from a hydrogen atom and linear or branched (C1-C8) alkyls,
- $R_{10}$ is a group selected from linear or branched (C1-C5) alkyls,
- $R_3$ and $R_7$ are each independently a group selected from: hydrogen, with X then being a single bond,
  - linear or branched alkyls of at least 6 carbon atoms, linear or branched alkenyls of at least 6 carbon atoms, or linear or branched alkynyls of at least 6 carbon atoms, with X then being a single bond,
  - (C3-C10) cycloalkyls or (C3-C10) (hetero)cycloalkyls, unsubstituted or substituted by one or more radicals selected from linear, cyclic or branched (C1-C8) alkyls, linear or branched (C1-C8) alkenyls, and linear or branched (C1-C8) alkynyls, with X then being a single bond, or selected from linear or branched (C1-C8) alkylenes, linear or branched (C2-C8) alkenylenes, and linear or branched (C2-C8) alkynylenes, (C3-C10) cycloalkenyls or (C3-C10) (hetero)cycloalkenyls, poly or monounsaturated, unsubstituted or substituted by one or more radicals selected from linear, cyclic or branched (C1-C8) alkyls, linear or branched (C1-C8) alkenyls, linear or branched (C1-C8) alkynyls, with X then being a single bond, or selected from linear or branched (C1-C8) alkylenes, linear or branched (C2-C8) alkenylenes, and linear or branched (C2-C8) alkynylenes, phenyl, unsubstituted or substituted by one or more radicals selected from linear, cyclic or branched (C1-C8) alkyls, linear or branched (C1-C8) alkenyls, linear or branched (C1-C8) alkynyls, with X then being a single bond, or selected from linear or branched (C1-C8) alkylenes, linear or branched (C2-C8) alkenylenes, and linear or branched (C2-C8) alkynylenes, provided that when one of the groups $R_3$ or $R_7$ is a linear or branched alkyl of at least 6 carbon atoms, a linear or branched alkenyl of at least 6 carbon atoms, or a linear or branched alkynyls of at least 6 carbon atoms, or a hydrogen atom, with X being a single bond, then the other group $R_3$ or $R_7$ is selected from:

(C3-C10) cycloalkyls or (C3-C10) (hetero)cycloalkyls, unsubstituted or substituted by one or more radicals selected from linear, cyclic or branched (C1-C8) alkyls, linear or branched (C1-C8) alkenyls, and linear or branched (C1-C8) alkynyls, with X then being a single bond, or selected from linear or branched (C1-C8) alkylenes, linear or branched (C2-C8) alkenylenes, and linear or branched (C2-C8) alkynylenes, (C3-C10) cycloalkenyls or (C3-C10) (hetero)cycloalkenyls, poly or monounsaturated, unsubstituted or substituted by one or more radicals selected from linear, cyclic or branched (C1-C8) alkyls, linear or branched (C1-C8) alkenyls, linear or branched (C1-C8) alkynyls, with X then being a single bond, or selected from linear or branched (C1-C8) alkylenes, linear or branched (C2-C8) alkenylenes, and linear or branched (C2-C8) alkynylenes, or phenyl, unsubstituted or substituted by one or more radicals selected from linear, cyclic or branched (C1-C8) alkyls, linear or branched (C1-C8) alkenyls, linear or branched (C1-C8) alkynyls, with X then being a single bond, or selected from linear or branched (C1-C8) alkylenes, linear or branched (C2-C8) alkenylenes, and linear or branched (C2-C8) alkynylenes, with w, x, y, z corresponding to the respective percentages of the units,
with x being between 20 and 90%,
with y being between 0 and 80%,
with w being between 0 and 80%, and
with z being between 0 and 60%, provided that w+x+y+z=100%, and that y or w is at least 10%.

In a particular embodiment, when $R_z$ and/or $R_T$ is a group selected from linear or branched alkyls of at least 6 carbon atoms, linear or branched alkenyls of at least 6 carbon atoms, or linear or branched alkynyls of at least 6 carbon atoms, with X then being a single bond, then said alkyls, alkenyls, or alkynyls have less than 18, 17, 16, 15, 14, 13, 12, 11, 10, 9, 8, or less than 7 carbon atoms.

The average molar mass of the amphipols according to the invention is less than 100,000 g·mol$^{-1}$, preferably between 2000 and 50,000 g·mol$^{-1}$.

The following are embodiments of the invention, which may or may not be taken in combination with another or some of them.

In a particular embodiment, M$^+$ is Na$^+$.

In a particular embodiment, y and/or w is greater than or equal to 25%. Indeed, polymers grafted at this percentage are particularly efficient, as shown in the experimental section.

In a particular embodiment, $R_2$, $R_6$, $R_9$ are hydrogen.

In a particular embodiment, w=0 and $R_7$ is a group selected from (C3-C10) cycloalkyls or (C3-C10) (hetero)cycloalkyls, unsubstituted or substituted by one or more radicals selected from linear, cyclic or branched (C1-C8) alkyls, linear or branched (C1-C8) alkenyls, and linear or branched (C1-C8) alkynyls, with X then being a single bond, or selected from linear or branched (C1-C8) alkylenes, linear or branched (C2-C8) alkenylenes, and linear or branched (C2-C8) alkynylenes. Preferably, X is a single bond and $R_7$ is a C6 cycloalkyl, preferably a C7 cycloalkyl, even more preferably a C8 cycloalkyl. Alternatively, X is a linear or branched (C1-C8) alkylene, preferably methyl or ethyl.

In another particular embodiment, w=0 and $R_7$ is phenyl, unsubstituted or substituted by one or more radicals selected from linear, cyclic or branched (C1-C8) alkyls, linear or branched (C1-C8) alkenyls, linear or branched (C1-C8) alkynyls, with X then being a single bond, or selected from linear or branched (C1-C8) alkylenes, linear or branched (C2-C8) alkenylenes, and linear or branched (C2-C8) alkynylenes. Preferably, X is a single bond and said phenyl is para-substituted. Even more preferably, when monosubstituted, said phenyl is para-substituted with a C1-C8 linear alkyl, even more preferably, said para-linear alkyl is selected from methyl or ethyl groups.

In one embodiment, w=0 and $R_7$ is phenyl unsubstituted or substituted by one or more radicals selected from linear, cyclic or branched (C1-C8) alkyls, linear or branched (C1-C8) alkenyls, linear or branched (C1-C8) alkynyls, and X is selected from linear or branched (C1-C8) alkylenes, preferably a C1 alkylene or a C2 alkylene.

In a particular embodiment, w and y are different from 0 and $R_3$ and $R_7$ are independently of each other:

(C3-C10) cycloalkyls or (C3-C10) (hetero)cycloalkyls, unsubstituted or substituted by one or more radicals selected from linear, cyclic or branched (C1-C8) alkyls, linear or branched (C1-C8) alkenyls, and linear or branched (C1-C8) alkynyls, with X then being a single bond, or selected from linear or branched (C1-C8) alkylenes, linear or branched (C2-C8) alkenylenes, and linear or branched (C2-C8) alkynylenes, (C3-C10) cycloalkenyls or (C3-C10) (hetero)cycloalkenyls, poly or monounsaturated, unsubstituted or substituted by one or more radicals selected from linear, cyclic or branched (C1-C8) alkyls, linear or branched (C1-C8) alkenyls, linear or branched (C1-C8) alkynyls, with X then being a single bond, or selected from linear or branched (C1-C8) alkylenes, linear or branched (C2-C8) alkenylenes, and linear or branched (C2-C8) alkynylenes, poly or monounsaturated polycycles, unsubstituted or substituted by one or more radicals selected from linear, cyclic or branched (C1-C8) alkyls, linear or branched (C1-C8) alkenyls, linear or branched (C1-C8) alkynyls, with X then being a single bond, or selected from linear or branched (C1-C8) alkylenes, linear or branched (C2-C8) alkenylenes, and linear or branched (C2-C8) alkynylenes, or phenyl, unsubstituted or substituted by one or more radicals selected from linear or branched (C1-C8) alkyls, linear or branched (C1-C8) alkenyls, linear or branched (C1-C8) alkynyls, with X then being a single bond, or selected from linear or branched (C1-C8) alkylenes, linear or branched (C2-C8) alkenylenes, and linear or branched (C2-C8) alkynylenes, preferably, $R_3$ and $R_7$ are then independently of each other:

a C6 cycloalkyl, preferably a C7 cycloalkyl, even more preferably a C8 cycloalkyl, phenyl, even more preferably para-substituted by a linear C1-C8 alkyl when monosubstituted, even more preferably said linear alkyl in para position is selected from methyl or ethyl groups, with X then being a single bond, or phenyl unsubstituted or substituted by one or more radicals selected from linear or branched (C1-C8) alkyls, linear, cyclic or branched (C1-C8) alkenyls, linear or branched (C1-C8) alkynyls, and X is selected from linear or branched (C1-C8) alkylenes, preferably a C1 alkylene or a C2 alkylene, even more preferably, $R_3$ and $R_7$ are different from each other.

In another particular embodiment, R3 and/or R7 is a group selected from (C3-C10) cycloalkyls or (C3-C10) (hetero)cycloalkyls, unsubstituted or substituted by one or more radicals selected from linear, cyclic or branched (C1-C8) alkyls, linear or branched (C1-C8) alkenyls, and linear or branched (C1-C8) alkynyls, with X then being a single bond, or selected from linear or branched (C1-C8) alkyls, preferably methyl or ethyl.

In another particular embodiment, $R_3$ and/or $R_7$ is phenyl, unsubstituted or substituted by one or more radicals selected from linear, cyclic or branched (C1-C8) alkyls, linear or branched (C1-C8) alkenyls, linear or branched (C1-C8) alkynyls, with X then being a single bond, or selected from linear or branched (C1-C8) alkylenes, preferably methyl or ethyl. Preferably, X is a single bond and said phenyl is para-substituted. Even more preferably, when monosubstituted, said phenyl is para-substituted with a C1-C8 linear alkyl, even more preferably, said para-linear alkyl is selected from methyl or ethyl groups.

In another embodiment, z is different from 0; preferably $R_{10}$ is then an isopropyl group, even more preferably R10 is an isopropyl group and, as regards the units comprising $R_3$ and/or $R_7$, X is selected from linear or branched (C1-C8) alkylenes, linear or branched (C2-C8) alkenylenes, and linear or branched (C2-C8) alkynylenes, with R3 and/or R7 being selected from:

(C3-C10) cycloalkyls or (C3-C10) (hetero)cycloalkyls, unsubstituted or substituted by one or more radicals selected from linear, cyclic or branched (C1-C8) alkyls, linear or branched (C1-C8) alkenyls, and linear or branched (C1-C8) alkynyls, (C3-C10) cycloalkenyls or (C3-C10) (hetero)cycloalkenyls, poly or monounsaturated, unsubstituted or substituted by one or more radicals selected from linear, cyclic or branched (C1-C8) alkyls, linear or branched (C1-C8) alkenyls, linear or branched (C1-C8) alkynyls, poly or monounsaturated polycycles, unsubstituted or substituted by one or more radicals selected from linear, cyclic or branched (C1-C8) alkyls, linear or branched (C1-C8) alkenyls, linear or branched (C1-C8) alkynyls, or phenyl, unsubstituted or substituted by one or more radicals selected from linear, cyclic or branched (C1-C8) alkyls, linear or branched (C1-C8) alkenyls, linear or branched (C1-C8) alkynyls.

In a particular embodiment, the amphiphilic vinyl polymer of formula I is selected from the compounds listed in Table I below, with $M^+$ being an alkali metal, preferably selected from $Li^+$, $Na^+$, $K^+$; in a particular embodiment, $M^+$ is $Na^+$.

TABLE I

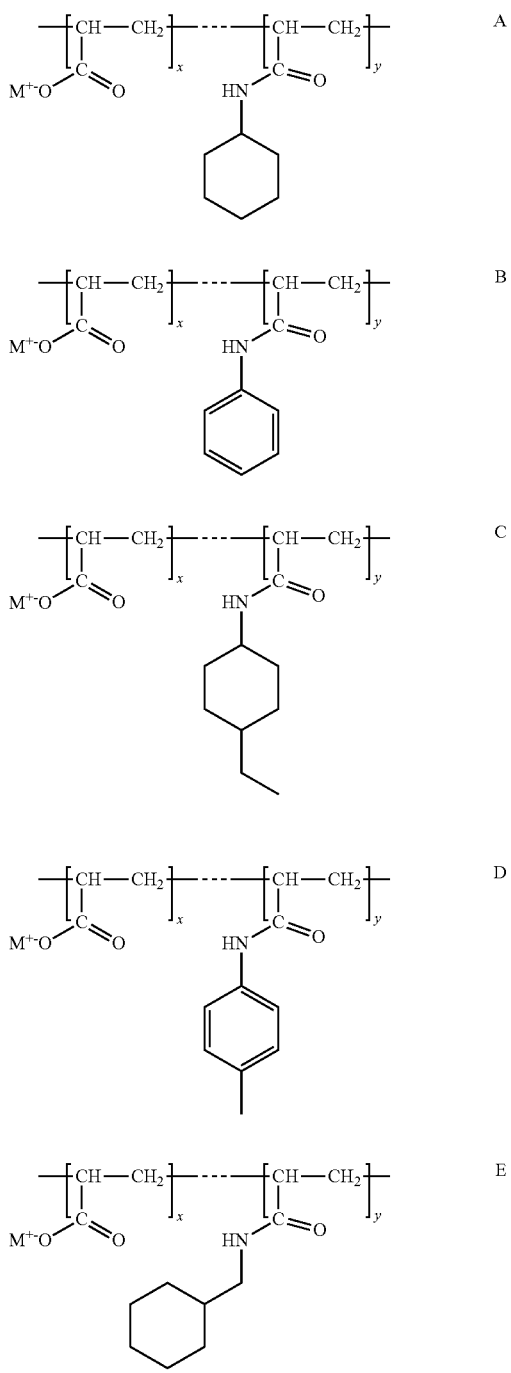

TABLE I-continued

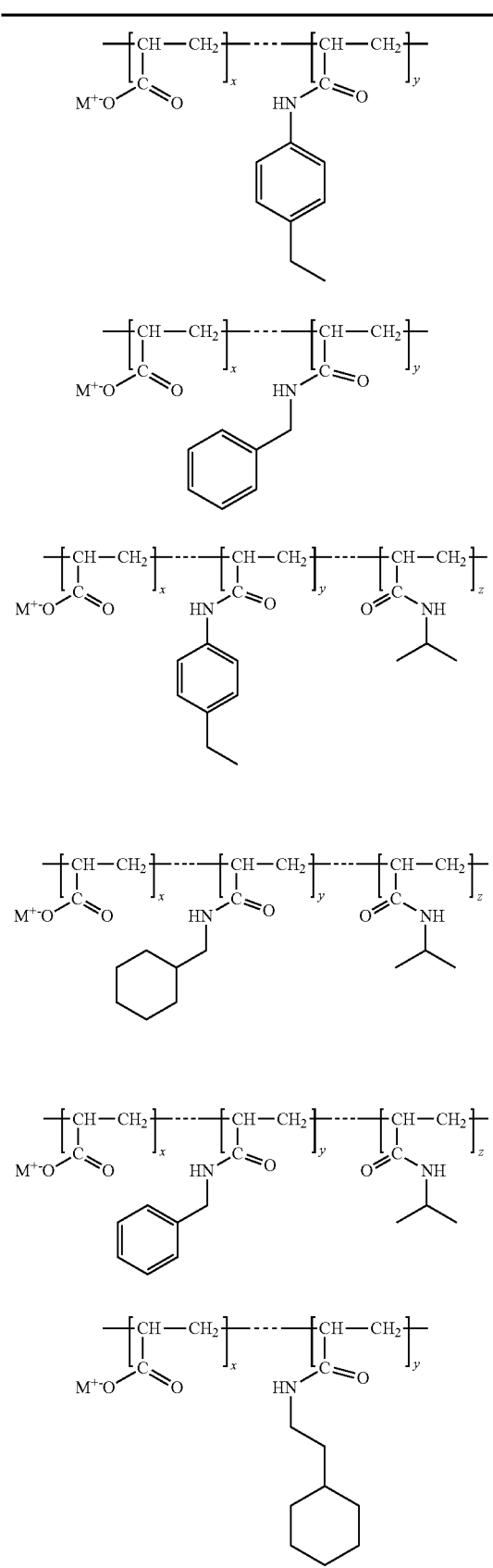

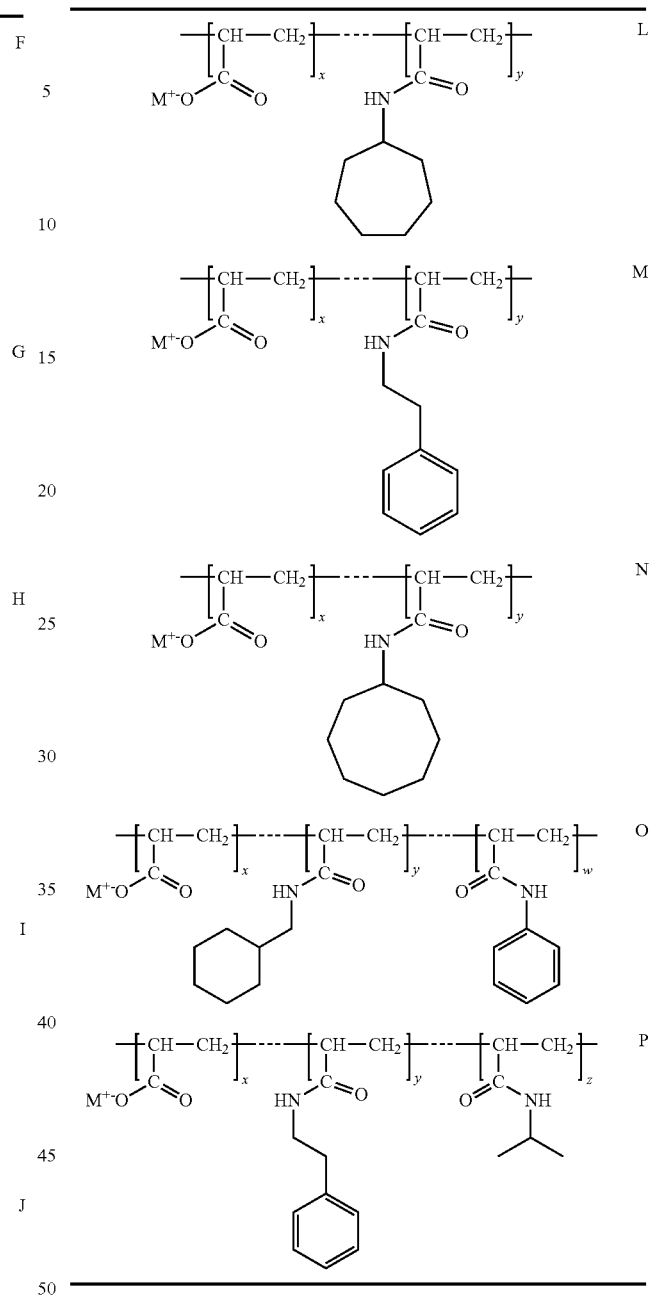

As mentioned, within the vinyl polymers of the invention, the percentages w, x, y, and z of the various units may vary, provided that w+x+y+z=100%. Where the percentages are specified with an accuracy of plus or minus 10%. Thus, for example, if a percentage for a unit is specified as 50%, it should be understood that this unit may be present between 45% and 55% in the polymer of the invention.

In a particular embodiment, x is less than or equal to 75%.

In another embodiment, w and/or y is between 25% and 50%, and z is between 0% and 40%, preferably between 15% and 40%.

In a particular embodiment, w+y is greater than or equal to 25%, preferably less than 50%.

In another particular embodiment, the polymers according to the invention are selected from the compounds of Table I with the proportions w, x, y, and z as specified in Table 11 below.

TABLE 2
| Formula | (x; y) or (x; y; z) or (x; y; w) (%) |
|---|---|
| 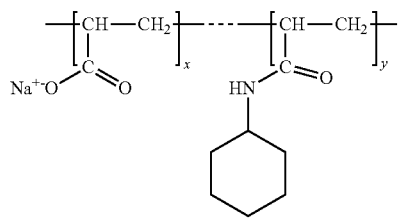 1 | (75; 25) |
| 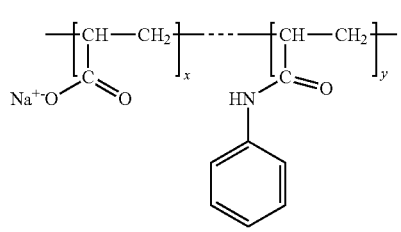 2 | (75; 25) |
| 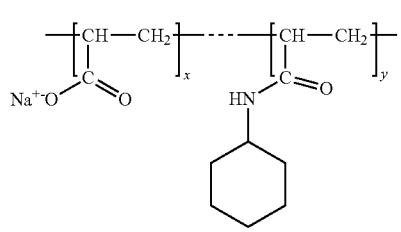 3 | (50; 50) |
| 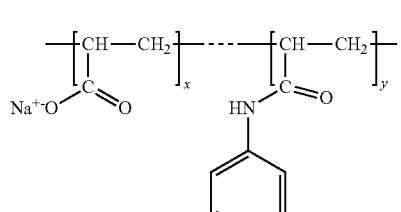 4 | (50; 50) |
| 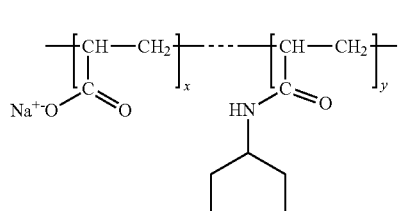 5 | (50; 50) |

TABLE 2-continued

| Formula | (x; y) or (x; y; z) or (x; y; w) (%) |
|---|---|
| Structure 6: copolymer of sodium acrylate (x) and N-(4-methylphenyl)acrylamide (y) | (50; 50) |
| Structure 7: copolymer of sodium acrylate (x) and N-(cyclohexylmethyl)acrylamide (y) | (75; 25) |
| Structure 8: copolymer of sodium acrylate (x) and N-(4-ethylphenyl)acrylamide (y) | (50; 50) |
| Structure 9: copolymer of sodium acrylate (x) and N-(cyclohexylmethyl)acrylamide (y) | (70; 30) |
| Structure 10: terpolymer of sodium acrylate (x), N-(4-ethylphenyl)acrylamide (y), and N-isopropylacrylamide (z) | (35; 50; 15) |

TABLE 2-continued
| Formula | (x; y) or (x; y; z) or (x; y; w) (%) |
|---|---|
| 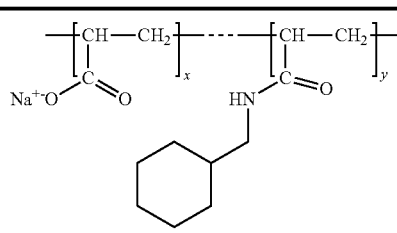<br>11 | (50; 50) |
| 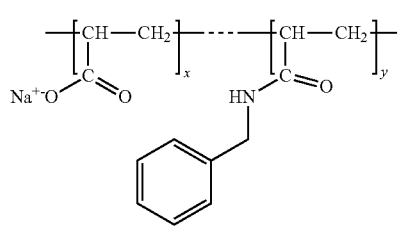<br>12 | (75; 25) |
| 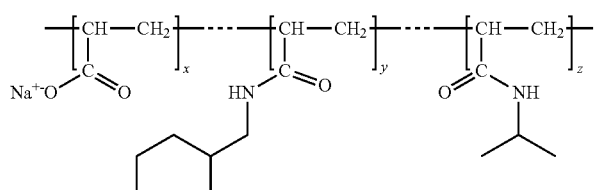<br>13 | (35; 25; 40) |
| 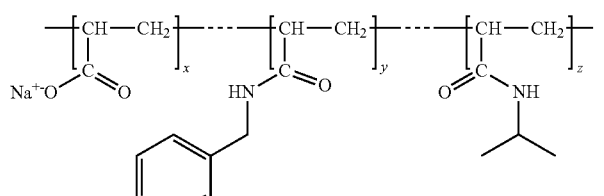<br>14 | (35; 50; 15) |
| 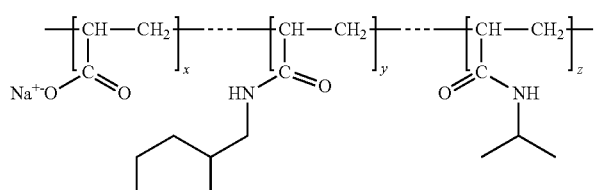<br>15 | (35; 50; 15) |
| 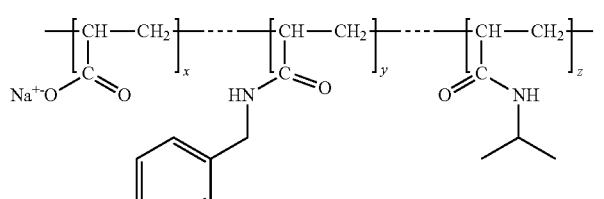<br>16 | (35; 25; 40) |

TABLE 2-continued

| Formula | (x; y) or (x; y; z) or (x; y; w) (%) |
|---|---|
| Structure 17: copolymer with Na⁺⁻O-C(=O)-CH-CH₂ (x) and HN-C(=O)-CH-CH₂ with -CH₂-CH₂-cyclohexyl side chain (y) | (75; 25) |
| Structure 18: copolymer with Na⁺⁻O-C(=O)-CH-CH₂ (x) and HN-C(=O)-CH-CH₂ with -CH₂-phenyl side chain (y) | (65; 35) |
| Structure 19: copolymer with Na⁺⁻O-C(=O)-CH-CH₂ (x) and HN-C(=O)-CH-CH₂ with -CH₂-CH₂-cyclohexyl side chain (y) | (50; 50) |
| Structure 20: copolymer with Na⁺⁻O-C(=O)-CH-CH₂ (x) and HN-C(=O)-CH-CH₂ with -CH₂-phenyl side chain (y) | (50; 50) |
| Structure 21: copolymer with Na⁺⁻O-C(=O)-CH-CH₂ (x) and HN-C(=O)-CH-CH₂ with cycloheptyl side chain (y) | (50; 50) |

TABLE 2-continued
| Formula | (x; y) or (x; y; z) or (x; y; w) (%) |
|---|---|
| 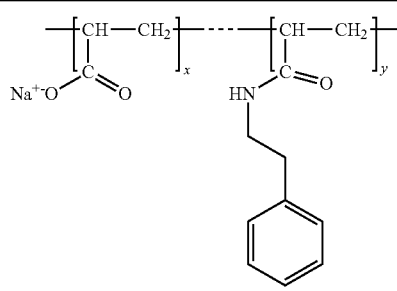 22 | (75; 25) |
| 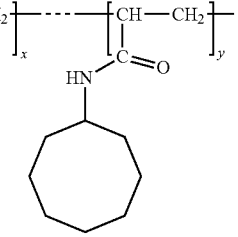 23 | (50; 50) |
| 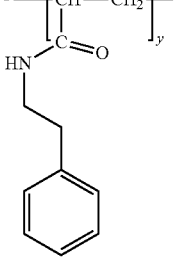 24 | (50; 50) |
| 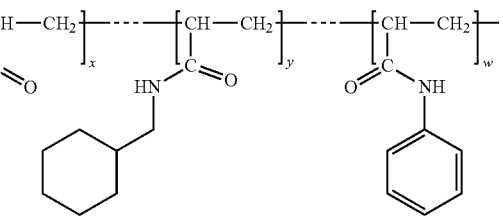 25 | (50; 25; 25) |
| 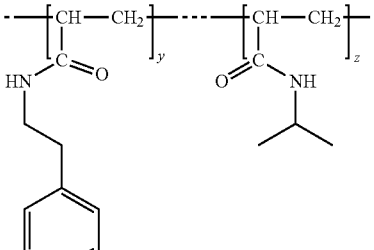 26 | (35; 50; 15) |

As demonstrated in the experimental section, the compounds of the invention, amphiphilic vinyl polymers, are novel amphipols which are particularly suitable for solubilizing and stabilizing membrane proteins, particularly in comparison with other polymers such as A8-35 or SMA. Thus, the complexes formed with membrane proteins are of particular interest for the study of membrane proteins as well as for the biotechnological applications of these proteins. The stabilization of proteins in their native state and/or at least in part the preservation of their activity is essential for these applications; as demonstrated in the experimental section, the polymers of the invention allow the solubilization of membrane proteins and this stabilization. In particular, solubilization can be carried out without detergent, which is particularly advantageous.

There is no limitation as to the type of membrane proteins within the complexes of the invention. From a biotechnological point of view, membrane proteins, known to be involved in pathologies, as drug targets or likely to be immunogenic, are particularly preferred.

Thus, possible applications for these complexes are, for example:

NMR in a liquid or solid medium, electron microscopy,
diagnosis: the search for circulating antibodies, soluble or carried by lymphocytes,
vaccination or antibody production: presentation of membrane proteins as immunogens,
detection/use of the enzymatic activity of membrane proteins when these are enzymes,
in pharmacology, measurement of the affinity of cell receptors for molecules of pharmaceutical interest.

From this point of view, the functionalized polymers of the invention are particularly advantageous. The one skilled in the art will be able to identify the functionalization means relevant to the intended use of the polymers of the invention. As an example, and in a non-limiting way, such means can be selected among those presented by Le Bon et al. (2014).

As mentioned, an object of the invention is the complexes formed by the polymers of the invention as described in the present application and membrane proteins. In a particular embodiment, for the above-mentioned applications, the complexes of the invention may be present within an aqueous solution, in lyophilized form or immobilized in a matrix or on a surface via the functional groups grafted onto the polymer of the invention.

The one skilled in the art will know how to determine experimentally the optimum mass ratio between the polymer of the invention and the membrane protein to obtain satisfactory solubilization and/or stabilization of the membrane protein. In a particular embodiment of detergent exchange for amphipol A8-35, the protein:amphipol ratio is between 1:0.1 and 1:10, preferably between 1:1 and 1:7.5, even more preferably between 1:1.5 and 1:5.

As explained in the experimental section, these compounds are amphipols, they allow the stabilization and/or solubilization of membrane proteins without the use of detergents which are known to have a negative effect on stability and therefore the activity of proteins. Advantageously, in one embodiment, this complex is therefore substantially free of detergent.

In another embodiment, the water-soluble complexes of the invention comprise lipids or a mixture of lipids. These may be useful for diluting membrane proteins, as discussed in the experimental section, or they may come from the membrane of the organism or organelle from which the solubilized and stabilized membrane protein originates within the complex. In a particular embodiment, said lipid is 1,2-dimyristoyl-sn-glycero-3-phosphocholine (DMPC).

Advantageously, the water-soluble complex may comprise all the subunits of a multimeric protein or any cofactor associated with the membrane protein, as shown by the experiments on solubilization and stabilization of bacteriorhodopsin presented in the experimental section.

As mentioned, the invention also relates to a method of preparing an aqueous solution of stabilized membrane protein(s) present within complexes with the polymers of the invention.

A method of preparing membrane protein complexes with amphipols of the state of the art, such as A8-35, is known in the prior art, this method involving the prior solubilization of the membrane proteins via bringing them together with a detergent medium. Such a method subsequently involves replacing the detergent with the amphipol by lowering the detergent concentration to a concentration below the critical micelle concentration. Lowering the detergent concentration can be achieved by dilution, adsorption of detergents, for example on Bio-Beads® SM-2, dialysis, separation on molecular sieve, or a gradient. However, this additional step is usually done at the expense of the yield or final concentration of the membrane protein-containing complex.

The novel amphipols of the invention have the ability to solubilize membrane proteins without this preliminary solubilization step by using a detergent preparation. Thus, an object of the invention is the use of polymers of the invention to solubilize and/or stabilize membrane proteins.

In another particular embodiment, the method of preparing a membrane protein solution or a mixture of membrane proteins according to the invention does not comprise the step of dissolution by means of a detergent preparation, with the solubilization being carried out by means of one of the polymers of the invention. In a still more particular embodiment, the polymer is selected from polymers of formula I selected such as w=0 and $R_7$ is a group selected from (C3-C10) cycloalkyls or (C3-C10) (hetero)cycloalkyls, unsubstituted or substituted by one or more radicals selected from linear, cyclic or branched (C1-C8) alkyls, linear or branched (C1-C8) alkenyls, and linear or branched (C1-C8) alkynyls, with X then being a single bond, or selected from linear or branched (C1-C8) alkylenes, linear or branched (C2-C8) alkenylenes, and linear or branched (C2-C8) alkynylenes. Preferably, X is a single bond and $R_7$ is a C6 cycloalkyl, preferably a C7 cycloalkyl, even more preferably a C8 cycloalkyl.

w=0 and $R_7$ is phenyl, unsubstituted or substituted by one or more radicals selected from linear, cyclic or branched (C1-C8) alkyls, linear or branched (C1-C8) alkenyls, linear or branched (C1-C8) alkynyls, with X then being a single bond, or selected from linear or branched (C1-C8) alkylenes, linear or branched (C2-C8) alkenylenes, and linear or branched (C2-C8) alkynylenes. Preferably, X is a single bond and said phenyl is para-substituted. Even more preferably, when monosubstituted, said phenyl is para-substituted with a C1-C8 linear alkyl, even more preferably, said para-linear alkyl is selected from methyl or ethyl groups.

In one embodiment, w=0 and R7 is phenyl unsubstituted or substituted by one or more radicals selected from linear, cyclic or branched (C1-C8) alkyls, linear or branched (C1-C8) alkenyls, linear or branched (C1-C8) alkynyls, and X is selected from linear or branched (C1-C8) alkylenes, preferably a C1 alkylene or a C2 alkylene.

The amphipols of the invention have polyacrylic acid as a precursor. Their synthesis is therefore very similar to that of other amphipols described in Gohon et al. (2006). The one skilled in the art will know how to adapt the protocol without particular difficulty in order to graft the specified groups randomly onto the polyacrylic acid precursor via the formation of amide bonds between a primary amine carried by said groups and a fraction of the carboxylate groups carried by the precursor. Preferably, the reaction is carried out in N-methylpyrrolidone (NMP) in the presence of dicyclohexylcarbodiimide (DCC). The synthesis can be carried out sequentially, with each step consisting of grafting a particular unit.

EXAMPLES

The following abbreviations have been used in the following examples.
OTG: Octylthioglucoside
DMPC: dimyristoylphosphatidylcholine
BR: bacteriorhodopsin
SERCA1a: sarco/endoplasmic reticulum Ca2+-ATPase 1a
SMA: Styrene maleic acid copolymer, formula:

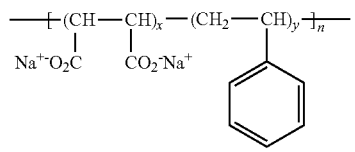

SMA (2:1) consists of two-thirds styrene and one-third maleic acid. SMA (3:1) consists of three-quarter styrene and one-quarter maleic acid.
A8-35: Amphipol of the formula:

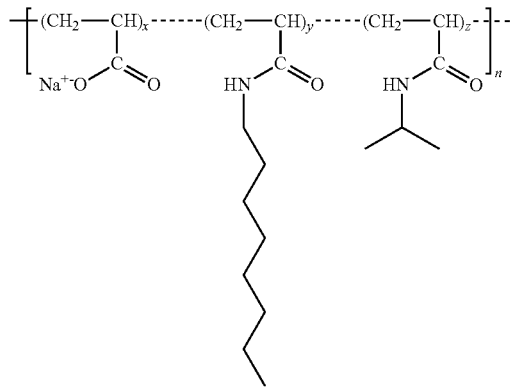

with x=~35%, y=~40%, and z=~25%
A8-75: as above but with x=~75%, y=~25%, and z=0%
E. coli: Escherichia coli
DDM: n-dodecyl-β-D-maltopyranoside
GFP: green fluorescent protein
AChR: acetylcholine receptor
EDTA: ethylenediaminetetraacetic acid
CHAPS: 3-[(3-Cholamidopropyl)dimethylammonio]-1-propanesulfonate hydrate
SDS: sodium dodecyl sulfate
Tris: Tris(hydroxymethyl)aminomethane The experimental data below were obtained using membrane fractions and/or proteins to study the properties of the novel amphipols of the invention. These examples are not limiting, in particular, the relative efficiencies of the amphipols of the invention may vary according to the membrane fraction or the membrane protein considered. Nevertheless, the improved solubilization and/or stabilization properties of the amphipols of the invention with respect to the reference polymers are of general application.

1. Example 1, Synthesis of the Amphipols of the Invention

As mentioned, the amphipols of the invention have polyacrylic acid as a precursor. Their synthesis is therefore very similar to that of A8-35 described in Gohon et al. (2006). It consists in randomly grafting the groups onto the polyacrylic acid precursor via the formation of amide bonds between a primary amine carried by the groups to be grafted and a fraction of the carboxylate groups carried by the precursor. The reaction is carried out in N-methylpyrrolidone (NMP) in the presence of dicyclohexylcarbodiimide (DCC). Grafting and obtaining the different units can be done in a sequential way. In particular, when z is different from 0, the grafting of the groups corresponding to a fraction of the carboxylate groups of the precursor takes place in a second step, in NMP in the presence of 1-hydroxybenzotriazole (HOBt)/DCC.

The amphipol is then obtained in its acid form. After synthesis, the polymer is purified by three cycles of precipitation at pH=3 followed by solubilization at pH=10. The polymer is then dialyzed against deionized water and then lyophilized.

The chemical composition of the polymer is determined by proton and carbon NMR analysis, coupled with a pH-metric assay.

Example of the Synthesis of Compound 23

In a 100 mL two-neck flask, 1.00 g of polyacrylic acid (1 eq., 13.89 mmol) is dissolved in 20 mL of N-Methyl-2-pyrrolidone (NMP). The medium is placed under agitation at 60° C. for 4 hours. 884.3 mg cyclooctylamine (0.50 eq., 6.94 mmol) is dissolved in 2 mL NMP and the resulting solution is added dropwise to the reaction medium with stirring. After the addition of the amine is completed, stirring is continued for 10 min and then 1.58 g of DCC (0.55 eq., 7.64 mmol) previously dissolved in 4 mL of NMP is added dropwise to the reaction medium. Once all the reagent has been added, the reaction medium is maintained under stirring at 60° C. for 1 hour, then left under stirring without heating for 4 hours.

Once at room temperature, the reaction medium is filtered over a sintered filter (pore size 4) and then 1.5 g of sodium methanolate (2 eq., 27.8 mmol) is added to the filtrate. Stirring is continued for about 15 minutes.

The reaction medium is then poured into 260 mL (10 equivalent volumes) of purified and deionized water (Milli-Q®) and the pH is adjusted to 10 (pH paper) with sodium hydroxide (11 N). The solution is maintained under vigorous agitation for about 30 minutes and then filtered over a sintered filter (pore size 4). The filtrate obtained is added manually dropwise to 21 mL of 2 N hydrochloric acid (3 eq., 42 mmol) under vigorous stirring. The addition is performed via a syringe, the tip of which is connected to a millipore filter system (0.45 μm PES prefilter and 0.2 μm cellulose acetate filter in series).

Once the addition is completed, the suspension obtained is filtered on a sintered filter (pore size 4) and the precipitate is dissolved in 50 mL of "Milli-Q®" water after addition of 1.9 mL (1.5 eq., 21 mmol) of 11 N sodium hydroxide. This precipitation/solubilization cycle is repeated four times, and then the basic solution finally obtained is dialyzed (Spectrapore membrane with a cut-off at 8000 g·mol$^{-1}$) for 24 hours against a 4.5·10$^{-3}$ N sodium hydroxide solution, and then lyophilized.

The one skilled in the art will be able to adapt this protocol to obtain the other amphipols of the invention without particular difficulty, in particular by adapting the choice of amines which are to react with the carboxylate groups of the polyacrylic acid.

2. Example 2, Analysis of the Amphipol Particles According to the Invention by Steric Exclusion Chromatography (SEC)

Material and Methods

A Superose 12/HR or 12 10/300 GL column (GE Healthcare) was used.

The column was equilibrated in 20 mM Tris pH 8.0, 100 mM NaCl buffer (FIG. 1A), or 20 mM sodium phosphate pH 7.0, 100 mM NaCl buffer (FIG. 1B).

As regards the BR/amphipol complexes (FIG. 1C), the purple membrane was solubilized in OTG (see Example 2), and then BR complexed with the amphipols at a BR/amphipol mass ratio of 1:5. The column was equilibrated in 20 mM sodium phosphate pH 7.0, 100 mM NaCl.

Elution was performed in 20 mM sodium phosphate pH 7.0, 100 mM NaCl.

Results

The elution profiles of the polymers of the invention obtained by SEC were compared to that of A8-35 (FIGS. 1A and B). In solution, A8-35 is known to form homogeneous, compact, globular particles of 40 kDa comprising about 9-10 molecules (Giusti et al., 2014; Gohon et al., 2006). Compared to A8-35, the polymers of the invention tested have broader elution peaks. This result can be explained by the presence of rings in the amphipols according to the invention which are less flexible than the linear octyl chains of A8-35 and therefore less favorable to the formation of spherical particles, resulting in the formation of larger and less homogeneous particles.

Also, the number of carbon atoms between the amide bond and the cycloalkyl group of the amphipols according to the invention seems to influence the size and homogeneity of the particles they form. Indeed, the addition of a carbon between the amide bond and the cycloalkyl ring (see the elution profiles of compound 3 and compound 11, FIG. 1A) results in more homogeneous particles with an elution profile comparable to that of amphipol A8-35. However, the presence of two carbon atoms (compound 17, FIG. 1A) results in larger and less homogeneous particles. As regards the amphipols grafted with a phenyl group (for example compounds 2 or 4), the elution profiles indicate that the particles formed by these polymers have a size greater than 40 kDa and are less homogeneous compared to A8-35. Homogeneity is greatly improved by the addition of an ethyl group (for example elution profile of compound 8) and results in particle sizes more in line with those of A8-35.

Interestingly, the elution profiles of the complexes formed by compounds 11 and 8 and bacteriorhodopsin (BR) are of comparable homogeneity and size with that of the BR/A8-35 complexes (FIG. 1C).

The polymers of the invention therefore constitute customizable tools which, in an aqueous medium, exhibit particle self-organization properties compatible with protein purification methods in terms of homogeneity. These particles are comparable with those formed by amphipol A8-35, which is a reference in the community.

3. Example 3, Study of the Stabilizing Effect

The membrane protein stabilizing effect of the amphipols according to the invention was tested on two model membrane proteins, SERCA1a (sarco/endoplasmic reticulum Ca$^{2+}$-ATPase 1a) and bacteriorhodopsin of *Halobacterium salinarum*.

Material and Methods

Model Membrane Proteins Used

SERCA1a is a calcium pump that requires the hydrolysis of an ATP molecule to perform its transport function. This protein belongs to the "P-type" ATPase family and its transmembrane segments adopt large amplitude conformational changes to allow the passage of calcium ions.

The purple color of BR is indicative of its native conformation. In its folded form, BR covalently but reversibly binds retinal (a chromophore) via the formation of a Schiff base. Protonation of this base causes the absorption peak of retinal to shift from ~380 nm (free form) to 570 nm or ~555 nm (bound form) depending on whether RB is embedded in the membrane or solubilized in an aqueous solution. The absorbance at 554 nm is therefore indicative of the native conformation of BR.

SERCA1a Production and Activity Measurement

Rabbit sarcoplasmic reticulum vesicles were prepared from muscle tissue following the protocol described in Champeil et al. (1985). These membranes are very rich in SERCA1a.

The ATPase activity of SERCA1a was measured indirectly by coupling several enzymatic reactions. The assay was performed in the presence of pyruvate kinase (0.1 mg/mL) and lactate dehydrogenase (0.1 mg/mL), on the one hand, in order to maintain a constant ATP concentration in the sample and, on the other hand, to monitor ATP consumption by measuring the decrease in absorbance at 340 nm of NADH over time. The sample buffer contains 100 mM KCl, 1 mM Mg$^{2+}$, 0.1 mM Ca$^{2+}$, 50 mM Tes-Tris (pH 7.5 at 20° C.), and 1-5 mM ATP. To perform the assay, the reaction medium also contains 1 mM phosphoenolpyruvate and 0.15 mM NADH.

Production of the Purple Membrane and Preparation of the BR/Amphipol Complexes

The preparation of BR/amphipol complexes takes place in the following steps:
  i) A culture of *Halobacterium salinarum* was performed and the membrane fraction corresponding to the purple membrane was purified according to the protocol already described in Oesterhelt & Stoeckenius (1971).
  ii) The purple membrane was solubilized in 10 mM sodium phosphate, 100 mM NaCl, 100 mM OTG buffer, for a 48-hour incubation in a cold room with agitation and in the dark. The sample was centrifuged for 20 min at 200,000 g at 6° C. The supernatant was diluted with OTG-free buffer to lower the detergent concentration from 100 mM to 18 mM.
  iii) Detergent replacement and preparation of the BR/amphipol complexes
    The concentration of BR was determined by measuring the absorbance at 554 nm. The amount of amphipol added was calculated based on the mass of BR present in the sample, corresponding to a BR/amphipol mass ratio of 1:5. After 20 min of incubation at 4° C., polystyrene beads (Bio-Beads® SM2, Bio-Rad) were added so that their mass was 20 times that of the detergent present in the sample. After 2 h of incubation at 4° C. with agitation, the beads were removed.

The formation of BR/A8-35 or BR/A8-75 complexes (positive controls) on the one hand, and BR complexes with the amphipols of the invention, on the other hand, was carried out according to the protocol of replacement and removal of the detergent by adsorption on polystyrene beads (Bio-Beads®, BioRad).

After the 20 min incubation in the presence of OTG and amphipols, Bio-Beads® were added to the mixture in a 20:1 Bio-Beads®/OTG mass ratio and incubated for 2 hours at 4° C. The absorbance at 554 nm of each sample was measured before and after centrifugation at 100,000 g for 20 min. The percentage of BR is calculated with reference to the absorbance measured in OTG before centrifugation.

Thermal Denaturation of BR

The ratio of the BR protein to the different solubilizing agents tested is 1:5, in 20 mM sodium phosphate, pH 7.0, 100 mM NaCl buffer. Samples were incubated at each temperature for 30 min and then cooled on ice before reading the absorbance at 554 nm. As regards the BR samples in detergent (OTG, Octylthioglucoside) a centrifugation step was performed to remove protein aggregates. The absorbance of the samples at 554 nm was measured with a UV-visible spectrophotometer using protein-free buffer as a reference. The absorbance values are normalized to the absorbance measured at 4° C.

Results

It was observed that compound 11 appeared to inhibit the ATPase activity of SERCA1a to a greater extent than A8-35 (not shown). Since the inhibitory effect of amphipols may be related to their stabilizing effect, it can be assumed that compound 11 stabilizes SERCA1a more effectively than A8-35.

The thermal stability of BR complexed with A8-35, A8-75, or the amphipols of the invention was analyzed. First, the ability of these polymers to keep the soluble BR in its native form was analyzed by measuring the absorbance of the supernatants at 554 nm.

After removing the detergent with Bio-Beads®, the percentage of BR in its native form in the samples after complexation with the amphipols of the invention comprising 25% hydrophobic cyclic groups and 75% unmodified carboxylate groups is higher than that observed using APol A8-75 as a reference (FIGS. 2 A and B), which is particularly inefficient in terms of BR stabilization. This result shows that cyclic groups increase the stabilizing effect of amphipols. Compounds 7 and 1 are "milder" than A8-75 with respect to denaturation. However, the stability of BR decreases with the increasing number of carbons between the ring and the amide bond until it reaches a level of destabilization similar to that of A8-75 (for example BR complexed with compound 17). This effect is more pronounced with amphipols grafted with cycloalkyl groups than with phenyl groups (FIG. 2B compounds 2, 12, 22).

Effect of Amphipol Loading

The influence of the charge of the amphipols of the invention was studied by increasing the grafting rate of the polymers with isopropyl groups, which results in a reduction of the overall charge of the amphipol. The reduction of the loading (via a grafting rate of the isopropyl groups up to 40%) thus obtained improves the rate of BR present in its native form in the samples after replacement of the detergent by the amphipol in the presence of Bio-Beads® (compare, for example, the absorbances for compounds 7 and 13). Conversely, a lower amount of BR is found in the supernatant when the loading density is decreased (compare, for example, compound 11 vs. compound 15), which could be due to BR aggregation.

For amphipols with a higher grafting ratio (50% cycloalkyl and/or phenyl groups and 50% unmodified carboxylate group), the destabilizing effect of the increasing number of carbon between the rings and the amide bond is significantly reduced (FIG. 2C).

The amphipols of the invention grafted with 50% cycloalkyl groups and/or phenyl groups have a charge density equivalent to SMA (2:1) or higher than SMA (3:1). However, with the exception of compound 4, all of the amphipols tested provide more BR in its native form than the two SMAs. (FIG. 2).

The thermal stability of BR complexed with the amphipols according to the invention was tested on the fraction of BR remaining native after exchange of the detergent by the amphipols using Bio-Beads®. The absorbance at 554 nm of the samples was monitored as a function of the temperature, with a drop in absorbance indicating denaturation of the protein (FIG. 3).

In the case of BR/A8-35 complexes, denaturation of the protein takes place in a very narrow temperature range, as indicated by the slope of the sigmoid obtained, with a molecular melting temperature (Tm) around 63° C. (FIG. 3A). The Tm of the protein in OTG detergent is significantly lower (~47° C., FIG. 3A), indicating lower stabilization of the protein in OTG. A similar Tm is observed for the protein complexed with SMA (3:1) or SMA (2:1), ~45° C. and ~49° C., respectively. Conversely, the Tm obtained with the amphipols according to the invention are significantly higher than those in SMA and for some comparable or even higher than that of the BR/A8-35 complexes (for example compounds 4 and 3, with Tm ~57° C. and ~66° C., respectively, FIG. 3B).

Thus, in terms of stabilization, the amphipols according to the invention are more effective than SMAs and may be at least as effective as the reference amphipol A8-35, or even more effective as suggested by the results obtained for SERCA1.

4. Example 4, Evaluation of the Solubilizing Effect of the Amphipols of the Invention on Membranes with High Membrane Protein Density Unlike detergents, A8-35 is known not to effectively solubilize SERCA1 from sarcoplasmic reticulum vesicles (Champeil et al., 2000). Typically, membrane proteins are always solubilized using detergents, which are then exchanged with A8-35 to stabilize them.

Conversely, Styrene Maleic Acid (SMA) copolymer is a polymer known to allow the solubilization of membrane proteins, without the need for the solubilization step with a detergent, resulting in the formation of lipid particles (SMALPs for SMA lipid particles) which comprise the membrane protein and lipids, surrounded by SMA. However, as seen above, the stability of BR in SMA is relatively poor compared to the same protein complexed with A8-35.

The solubilization properties of SMA, A8-35, and the amphipols according to the invention were compared for different types of membranes more or less rich in membrane proteins (membrane of *E. coli*, electric organs of *T. marmorata*, thylakoids of *C. reinhardtii*, purple membrane of *H. salinarum*). The results obtained are specific to the tested membranes and illustrate the different properties of the different polymers. Thus, a polymer that is weakly effective for one of these model membranes could be quite effective for another type of membrane because of its specific protein and/or lipid composition.

Material and Methods

Preparation of Fractions of *Halobacterium salinarum* Purple Membrane, *Chlamydomonas reinhardtii* Thylakoid Membrane, Torpedo Marmorata Electric Organ Membrane or *Escherichia coli* Membrane.

As mentioned earlier, the purple membrane of *Halobacterium salinarum* is prepared according to the protocol described in Oesterhelt & Stoeckenius (1971).

Membranes extracted from electric organs of Torpedo marmorata naturally rich in acetylcholine receptor (AChR) are prepared according to the protocol described in Sobel et al. (1977).

*Chlamydomonas reinhardtii* thylakoid membranes are prepared according to the protocol described in Pierre et al. (1995).

*Escherichia coli* membranes overexpressing the YidC protein, fused C-terminally to GFP, are prepared after mechanical lysis of bacteria with a cell disruptor (Constant Systems). Cell debris and unbroken cells are removed by low-speed centrifugation. The supernatant is recovered and the membranes are pelleted by high-speed centrifugation (100,000 g for one hour). The protocol for the preparation of *E. coli* membranes is described in Angius et al. (2018).

Dilution of the Purple Membrane Fraction with DMPC Vesicles

DMPC vesicles (50 mg/mL) were formed by extrusion after 10 passages through a polycarbonate membrane (Whatman) calibrated with 100 nm diameter pores. The DMPC vesicles and the purple membrane are mixed in order to obtain a BR:DMPC mass ratio of 1:5 and then incubated for 30 minutes in a sonication bath according to the protocol previously described by Knowles et al. (2009). The sample buffer contains 20 mM sodium phosphate pH 7.0, 100 mM NaCl.

Solubilization of the Purple Membrane in OTG

Solubilization in OTG (100 mM) was performed as described above. Samples were incubated for one hour at 4° C. before centrifugation (20 min 100,000 g), and the supernatants were collected for absorbance measurement at 544 nm.

Solubilization of the Purple Membrane with the SMAs or Amphipols of the Invention For each condition, the BR/SMA or amphipol mass ratio is 1:6.25 and the BR/DPMC mass ratio is 1:5. The buffer used is 20 mM sodium phosphate, pH 7.0, 100 mM NaCl as mentioned above.

Samples were incubated overnight at room temperature, with agitation, and then centrifuged for 20 min at 100,000 g, and absorbance measurements performed on the supernatants.

The absorbances are normalized to the absorbance value measured before the ultracentrifugation step.

Solubilization of *E. coli* Membranes Overexpressing a Recombinant Membrane Protein with the Amphipols of the Invention, SMAs, or DDM YidC is an evolutionarily conserved membrane protein with 6 transmembrane domains in gram-negative bacteria. A recombinant form fused to GFP is used as a membrane solubilization "reporter" protein to study the properties of the amphipols of the invention.

The total membrane proteins present in *E. coli* membrane extracts are assayed using a colorimetric test. The protein concentration is adjusted to 2 mg/mL with 20 mM Tris pH 8, 150 mM NaCl buffer.

For solubilization, the mass ratio of total protein/amphipols or SMA is 1:1. In the case of the control sample in the presence of a detergent, the mass ratio of total protein/DMD is 1:5. As mentioned above, the buffer used in all conditions consists of 20 mM Tris, pH 8.0, 150 mM NaCl.

The samples are incubated for two hours at 4° C., with agitation. To monitor the solubilization kinetics, an aliquot is taken from each tube every 15 minutes during the first hour of incubation, and then every half hour during the second hour.

At each sampling, the samples are centrifuged for 10 min at 250,000 g. The pellets, separated from the supernatants, are resuspended in the initial volume of solubilization with 20 mM Tris pH 8, 150 mM NaCl buffer containing 5% SDS.

To these samples is added a loading blue compatible with a fluorescence measurement on acrylamide gel. This is a loading blue prepared according to the protocol described in Drew et al. (2008). The samples, corresponding to the supernatants and pellets of each condition and taken at the indicated times, are plated on a 12% acrylamide gel.

Electrophoresis is performed in the presence of SDS in the migration buffer containing Tris-glycine pH 8.3. The migration of proteins in the gel is done for 1 hour by applying a current of 100 V and 20 mA per gel.

Once the migration is completed, each gel is placed in "Milli-Q®" water and a fluorescence picture of the gels, taken with a laser scanner ($\lambda_{excitation}$=495 nm; $\lambda_{emission}$=519 nm) allows the fluorescence of the GFP to be measured.

The ImageJ software allows the integration of the areas of each band to quantify the fluorescence. Results are normalized to the fluorescence obtained in detergent (DDM—1 hour).

Solubilization of the AChR-Enriched Torpedo Marmorata Membrane with the Amphipols of the Invention, SMAs, or CHAPS—Solubilization of AChR.

AChR is an intrinsic membrane protein. The electrical organs of Torpedo Marmorata are particularly rich in this protein. These organs are therefore an important source and a model for studying the acetylcholine receptor.

The total membrane proteins present in the extracts of Torpedo marmorata membranes are assayed using a colorimetric test. The protein concentration is adjusted to 1 mg/mL with 5 mM NaP pH 7.2, 100 mM NaCl, 1 mM EDTA buffer.

For solubilization, the mass ratio of total protein/amphipols or SMA is 1:5. In the case of the control sample, that is to say in the presence of a detergent, the mass ratio of total protein/CHAPS is 1:4.

The samples are incubated for one hour at 4° C., with agitation, before being centrifuged for 20 min at 100,000 g. The pellets, separated from the supernatants, are resuspended in the initial volume of solubilization with 5 mM NaPi pH 7.2, 100 mM NaCl, 1 mM EDTA buffer.

The samples, corresponding to the supernatants and pellets of each condition, are mixed with loading blue prepared according to the protocol described in Laemmli (1970) before being plated on a 10% acrylamide gel.

Electrophoresis is performed in the presence of SDS in the migration buffer containing Tris-glycine pH 8.3. The migration of proteins in the gel is done for 1 hour by applying a current of 100 V and 20 mA per gel.

Once the migration is complete, each gel is stained with Coomassie blue and a photo of the gels is taken under white light.

Results

It has been observed that the solubilization efficiency of the polymers is closely related to the composition of the membrane from which the membrane proteins are to be extracted (both in terms of proteins and lipids). Indeed, none of the polymers tested, whether A8-35, the amphipols according to the invention, or even the SMAs, is capable of solubilizing protein-rich membranes such as the purple membrane of *Halobacterium salinarum* (FIG. 4A), or that of the thylakoids of *Chlamydomonas reinhardtii* (not shown), whereas most of them are able to solubilize the membranes of *E. coli* overexpressing a recombinant protein such as YidC-GFP (see FIG. 7). Nevertheless, the amphipols of the invention are generally more effective than the A8-35 polymers or the SMAs.

The purple membrane of *Halobacterium salinarum* comprises 75% BR for 25% lipids. Due to this singular composition, its solubilization by SMA is only possible when the membrane is previously fused with DPMC vesicles, in order to "dilute" the BR protein in lipids (Knowles et al., 2009; Orwick-Rydmark et al., 2012). Under these conditions, the amphipols of the invention are also able to solubilize BR, while A8-35 remains ineffective (FIG. 4B).

As regards the amphipols of the invention comprising a grafting with a phenyl group, it is observed that the addition of an ethyl group on the aromatic site allows the solubilization properties to be increased (compare the percentage of solubilized BR for compounds 4, 6, and 8). Note that the location of the ethyl group in the para position (position 4) or ortho position (position 1) does not seem to be important, as compounds 8 and 24 provide comparable solubilization (FIG. 4B).

The cycloalkyl-grafted amphipols of the invention are particularly effective in solubilizing BR. Compound 23 in particular is found to be as effective as SMA (2:1) (compare pellet size), but the amount of BR present in its native form in the supernatant is higher than that obtained with SMA (2:1) or SMA (3:1); with compound 21 being significantly more effective than SMA (2:1).

In addition, steric exclusion chromatography analysis of the BR/lipid/amphipol complexes according to the invention show that they are much more homogeneous in size than those obtained using SMA, which is particularly advantageous in protein characterization techniques (not shown).

The efficiency of the polymers of the invention to extract the membrane protein YidC-GFP overexpressed in *E. coli* membranes, here the protein, was also tested and compared with A8-35 and the SMAs. By setting the protein/polymer ratio at 1:1, that is to say by working at low polymer concentrations, the amphipol polymers of the invention have a better extraction efficiency of the recombinant protein of interest than A8-35 and the SMAs. Indeed, after two hours of incubation, in the presence of the amphipol polymers of the invention, the amount of protein extracted is about 80%, compared to about 35% in the presence of A8-35 or the SMAs. In addition, the extraction kinetics of the membrane protein of interest is faster (FIG. 7). Thus, the amphipols of the invention are effective at low concentrations and allow for a faster extraction which is particularly advantageous, especially in the context of the production of recombinant membrane proteins.

The efficiency of the polymers of the invention to extract the acetylcholine receptor (AChR) from the membrane of the electric organs of Torpedo marmorata was also tested. At a protein/polymer ratio set at 1:5, the polymers of the invention show an extraction efficiency of the membrane protein of interest better than that of A8-35 and SMA (2:1) and comparable to that of SMA (3:1) (FIG. 8, compare the columns noted S). Surprisingly, the control polymer (A8-50), comprising octylamine chains, thus having the same number of carbon atoms as in the cyclohexylethylamine (as in compound 19), and cyclooctylamine (as in compound 23) groups, and grafted at the same percentage (50%), is less effective in extracting AchR than the polymers of the invention. This result indicates that the molecular architecture of the hydrophobic group may play an important role in the amphipols of the invention.

It should be noted that the amphipols of the invention are also particularly more effective in solubilizing the sodium-potassium pump of the membranes of the electrical organs of *T. marmorata* than A8-50 or A8-35.

At a lower polymer concentration, the amphipols of the invention were again found to be more effective in solubilizing AchR or the sodium-potassium pump than A8-35, A8-50, and SMA 3-1 (data not shown).

5. Example 5, Study of the Stabilizing Effect of the Amphipols on Membrane Proteins after Direct Extraction from the Membrane The stabilizing effect of the amphipols according to the invention with respect to BR was tested directly after solubilization of the purple membrane without having to resort to the steps of solubilization by OTG, and then exchange of the OTG by the amphipols. Two independent sets of experiments were conducted. The results of the first experiment are shown in FIGS. 5A and B. For the second series of experiments, each condition was performed at least in triplicates (FIG. 6).

Material and Methods

Solubilization of the Purple Membrane after Fusion with Preformed DMPC Vesicles.

i) As mentioned earlier, the purple membrane was fused to DMPC vesicles according to the protocol described by Orwick-Rydmark et al. (2012) before initiating the solubilization step with the amphipols. After 24 hours of incubation at room temperature, the samples were centrifuged at 100,000×g for 20 min. The supernatants were separated from the pellet.

ii) The absorbance at 554 nm (which reflects the amount of native BR) of the supernatants is measured. Quantification of the solubilization efficiency was done by plotting this value against the value measured before centrifugation (FIG. 5A, gray bars in FIG. 6A). This provides the percentage of native RB solubilized in the supernatant.

Evaluation of BR Stability.

After solubilization, the samples were incubated at 50° C. for 6 h, and then the absorbance at 554 nm was measured. The absorbance values were normalized to the initial absorbance value measured before incubation (FIG. 5B and FIG. 6B). The black bars in FIG. 6A correspond to the amount of stable BR, normalized to the initial amount of BR before centrifugation (that is to say before the solubilization step). To monitor the denaturation kinetics of BR, this experiment was repeated by measuring the absorbance at 554 nm of the samples every hour (FIG. 6B).

When comparing the reference polymers, that is to say A8-35 and the two SMAs, the solubilizing power of the SMAs correlates with a low stabilizing power of the BR. Conversely, A8-35, which solubilizes BR to a limited extent, stabilizes it effectively (FIGS. 5A and B and FIG. 6A).

The polymers of the invention tested allow BR to be solubilized as effectively as SMA (3:1) while stabilizing the protein at least as effectively as A8-35 (compare absorbances for compounds 19 and 23 with the reference polymers, FIGS. 5A and B, and FIG. 6).

6. Conclusion

Thus, the experimental data provided show that the novel amphipols of the present invention are particularly advantageous novel polymers. Indeed, the purification of membrane proteins requires solubilizing them while preserving their conformation and their stability, these two steps may seem antinomic, with solubilization involving in particular the use of surfactants with a dissociating power which generally lead to at least partial denaturation of the membrane proteins over time. Based on model membrane proteins, the results show that the novel amphipols of the invention have interesting solubilization properties for the purification of membrane proteins, while preserving the stability of these proteins and thus their conformation and their biological activity, which is essential for their study or use in biotechnological applications and not observed with the polymers of the prior art. Furthermore, the polymers of the invention are effective also at low concentrations, which is particularly advantageous for these applications.

REFERENCES

Angius F, Ilioaia O, Amrani A, Suisse A, Rosset L, Legrand A, Abou-Hamdan A, Uzan M, Zito F, Miroux B. (2018) A novel regulation mechanism of the T7 RNA polymerase based expression system improves overproduction and folding of membrane proteins. *Sci Rep.* 8, 8572.

Champeil, P., Guillain, F., Venien, C., Gingold M P. (1985). Interaction of magnesium and inorganic phosphate with calcium-deprived sarcoplasmic reticulum adenosinetriphosphatase as reflected by organic solvent induced perturbation. *Biochemistry* 24(1), 69-81.

Champeil, P., Menguy, T., Tribet, C., Popot, J.-L. and le Maire, M. (2000). Interaction of amphipols with the sarcoplasmic reticulum Ca2+-ATPase. *J. Biol. Chem.* 275, 18623-18637.

Drew, D., Newstead, S., Sonoda, Y., Kim, H., von Heijne, G., and Iwata, S. (2008). GFP-based optimization scheme for the overexpression and purification of eukaryotic membrane proteins in *Saccharomyces cerevisiae*. *Nat. Protoc.* 3, 784-798.

Giusti, F., Rieger, J., Catoire, L., Qian, S., Calabrese, A. N., Watkinson, T. G., Casiraghi, M., Radford, S. E., Ashcroft, A. E. and Popot, J.-L. (2014). Synthesis, characterization and applications of a perdeuterated amphipol. *J. Membr. Biol.* 247, 909-924.

Gohon, Y., Giusti, F., Prata, C., Charvolin, D., Timmins, P., Ebel, C., Tribet, C. and Popot, J.-L. (2006). Well-defined nanoparticles formed by hydrophobic assembly of a short and polydisperse random terpolymer, amphipol A8-35. *Langmuir* 22, 1281-1290.

Knowles, T. J., Finka, R., Smith, C., Lin, Y.-P., Dafforn, T. and Overduin, M. (2009). Membrane proteins solubilized intact in lipid containing nanoparticles bounded by styrene maleic acid copolymer. *J. Am. Chem. Soc.* 131, 7484-7485.

Laemmli, U. K. (1970) Cleavage of structural proteins during the assembly of the head of bacteriophage T4. *Nature* 227, 680-685.

Le Bon, C., Popot, J.-L. and Giusti, F. (2014). Labeling and functionalizing amphipols for biological applications. *J. Membr. Biol.* 247, 797-814.

Orwick-Rydmark, M., Lovett, J. E., Graziadei, A., Lindholm, L., Hicks, M. R. and Watts, A. (2012). Detergent-free incorporation of a seven-transmembrane receptor protein into nanosized bilayer Lipodisq particles for functional and biophysical studies. *Nano Lett.* 12, 4687-4692.

Oesterhelt & Stoeckenius (1971). Rhodopsin-like Protein from the Purple Membrane of *Halobacterium halobium*. *Nat. New Biol.* 233, 149-152.

Pierre Y, Breyton C, Kramer D, Popot J L. (1995). Purification and characterization of the cytochrome b6 f complex from *Chlamydomonas reinhardtii*. *J Biol Chem.;* 270, 29342-9.

Sobel A, Weber M, Changeux J P. (1977) Large-scale purification of the acetylcholine-receptor protein in its membrane-bound and detergent-extracted forms from Torpedo marmorata electric organ. *Eur. J. Biochem.* 80, 215-224.

Zoonens M & Popot J-L. Amphipols for each season, *J Membr Biol.* 2014, 247:759-96.

The invention claimed is:

1. A water-soluble membrane protein-amphiphilic vinyl polymer complex comprising the amphiphilic vinyl polymer of formula I:

Formula I

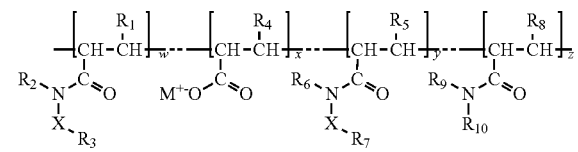

wherein:

$M^+$ is an alkali metal, $R_1$, $R_4$, $R_5$, $R_8$ are each independently a hydrogen atom or a methyl radical, $R_2$, $R_6$, $R_9$ are each independently a group selected from a hydrogen atom, linear (C1-C8) alkyls, and branched (C3-C8) alkyls, $R_{10}$ is a group selected from linear (C1-C5) alkyls and branched (C3-C5) alkyls, $R_3$ and $R_7$ are each independently a group selected from the group consisting of:
  hydrogen, with X then being a single bond,
  linear or branched alkyls of at least 6 carbon atoms, linear or branched alkenyls of at least 6 carbon atoms, linear or branched alkynyls of at least 6 carbon atoms, with X then being a single bond,
  (C3-C10) cycloalkyls or (C3-C10) (hetero) cycloalkyls, unsubstituted or substituted by one or more radicals selected from linear, cyclic or branched (C1-C8) alkyls, linear or branched (C2-C8) alkenyls, and linear or branched (C2-C8) alkynyls, with X then being selected from a single bond, linear (C2-C8) alkylenes, branched (C3-C8) alkylenes, linear (C2-C8) alkenylenes, branched (3-C8) alkenylenes, linear (C2-C8) alkynylenes and branched (C3-C8) alkynylenes,
  (C3-C10) cycloalkenyls or (C3-C10) (hetero) cycloalkenyls, poly or monounsaturated, unsubstituted or substituted by one or more radicals selected from linear, cyclic or branched (C1-C8) alkyls, linear or branched (C2-C8) alkenyls, linear or branched (C2-C8) alkynyls, with X then being selected from a single bond, linear (C2-C8) alkylenes, branched (C3-

C8) alkylenes, linear (C2-C8) alkenylenes, branched (C2-C8) alkenylenes, linear (C2-C8) alkynylenes and branched (C2-C8) alkynylenes, poly or monounsaturated polycycles, unsubstituted or substituted by one or more radicals selected from linear, cyclic or branched (C1-C8) alkyls, linear or branched (C2-C8) alkenyls, and linear or branched (C2-C8) alkynyls, with X then being selected from a single bond, linear (C2-C8) alkylenes or branched (C3-C8) alkylenes, linear (C2-C8) alkenylenes, branched (C2-C8) alkenylenes, linear (C2-C8) alkynylenes and branched (C3-C8) alkynylenes, and phenyl, unsubstituted or substituted by one or more radicals selected from linear, cyclic or branched (C1-C8) alkyls, linear or branched (C2-C8) alkenyls, and linear or branched (C2-C8) alkynyls, with X then being selected from a single bond, linear (C2-C8) alkylenes, branched (C3-C8) alkylenes, linear (C2-C8) alkenylenes, branched (C3-C8) alkenylenes, linear (C2-C8) alkynylenes, and branched (C3-C8) alkynylenes, with w, x, y, z corresponding to the respective percentages of the units, with x being between 20 and 90%, with y being between 0 and 80%, with w being between 0 and 80%, and with z being between 0 and 60%, provided that w+x+y+z=100%, and that y or w is at least 10%, provided that when one of the groups $R_3$ or $R_7$ is a linear or branched alkyl of at least 6 carbon atoms, a linear or branched alkenyl of at least 6 carbon atoms, a linear or branched alkynyl of at least 6 carbon atoms, or a hydrogen atom, with X being a single bond, then w and y are different from 0 and the other group $R_3$ or $R_7$ is selected from the group consisting of:

C3-C10) cycloalkyls or (C3-C10) (hetero) cycloalkyls, unsubstituted or substituted by one or more radicals selected from linear, cyclic or branched (C1-C8) alkyls, linear or branched (C2-C8) alkenyls, and linear or branched (C2-C8) alkynyls, with X then being selected from a single bond, linear (C2-C8) alkylenes, branched (C3-C8) alkylenes, linear (C2-C8) alkenylenes, branched (C3-C8) alkenylenes, linear (C2-C8) alkenylenes and branched (C3-C8) alkynylenes, (C3-C10) cycloalkenyls or (C3-C10) (hetero) cycloalkenyls, poly or monounsaturated, unsubstituted or substituted by one or more radicals selected from linear, cyclic or branched (C1-C8) alkyls, linear or branched (C2-C8) alkenyls, and linear or branched (C2-C8) alkynyls, with X then being selected from a single bond, linear (C2-C8) alkylenes, branched (C3-C8) alkylenes, linear (C2-C8) alkenylenes or branched (C3-C8) alkenylenes, linear (C2-C8) alkynylenes, and branched (C3-C8) alkynylenes, poly or monounsaturated polycycles, unsubstituted or substituted by one or more radicals selected from linear, cyclic or branched (C1-C8) alkyls, linear or branched (C2-C8) alkenyls, and linear or branched (C2-C8) alkynyls, with X then being selected from a single bond, linear (C2-C8) alkylenes, branched (C3-C8) alkylenes, linear (C2-C8) alkenylenes, branched (C3-C8) alkenylenes, linear (C2-C8) alkynylenes, and branched (C3-C8) alkynylenes, and phenyl, unsubstituted or substituted by one or more radicals selected from linear, cyclic or branched (C1-C8) alkyls, linear or branched (C2-C8) alkenyls, and linear or branched (C2-C8) alkynyls, with X then being selected from a single bond, linear (C2-C8) alkylenes, branched (C3-C8) alkylenes, linear (C2-C8) alkenylenes, branched (C3-C8) alkenylenes, linear (C2-C8) alkynylenes, and branched (C3-C8) alkynylenes.

2. The water-soluble membrane protein-amphiphilic vinyl polymer complex according to claim 1, wherein in the amphiphilic vinyl polymer of formula I, $M^+$ is $Na^+$.

3. The water-soluble membrane protein-amphiphilic vinyl polymer complex according to claim 1, wherein in the amphiphilic vinyl polymer of formula I, at least one of w or y is greater than or equal to 25% and less than or equal to 80%.

4. The water-soluble membrane protein-amphiphilic vinyl polymer complex according to claim 1, wherein in the amphiphilic vinyl polymer of formula I, $R_{10}$ is an isopropyl group.

5. The water-soluble membrane protein-amphiphilic vinyl polymer complex according to claim 1, wherein in the amphiphilic vinyl polymer of formula I, x is at least 20% and less than or equal to 75%.

6. The water-soluble membrane protein-amphiphilic vinyl polymer complex according to claim 1, wherein in the amphiphilic vinyl polymer of formula I, at least one of w or y is between 25% and 50%, and z is between 0% and 40%.

7. The water-soluble membrane protein-amphiphilic vinyl polymer complex according to claim 1, wherein in the amphiphilic vinyl polymer of formula I:

at least one of $R_3$ or $R_7$ is ($C_6$-$C_8$) cycloalkyls, or at least one of $R_3$ or $R_7$ is phenyl, with X being selected from a single bond, linear (C2-C8) alkylenes, branched (C3-C8) alkylenes, linear (C2-C8) alkenylenes, branched (C3-C8) alkenylenes, linear (C2-C8) alkynylenes, and branched (C3-C8) alkynylenes.

8. The water-soluble membrane protein-amphiphilic vinyl polymer complex according to claim 1, wherein in the amphiphilic vinyl polymer of formula I:

each of $R_1$, $R_2$, $R_4$, $R_5$, $R_6$, $R_8$, and $R_9$, is a hydrogen atom, at least one of $R_3$ or $R_7$ is ($C_6$-$C_8$) cycloalkyl, and X is a single bond, $R_{10}$ is an isopropyl group, x is equal to 35% or 50%, y is greater than or equal to 25%, w is equal to 0%, or 25%, and z is equal to 0%, 15% or 40%, provided that w+x+y+z=100%.

9. The water-soluble membrane protein-amphiphilic vinyl polymer complex according to claim 1, wherein the amphiphilic vinyl polymer is selected from:

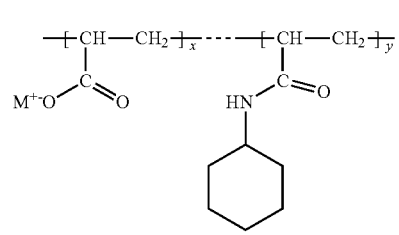

A

B
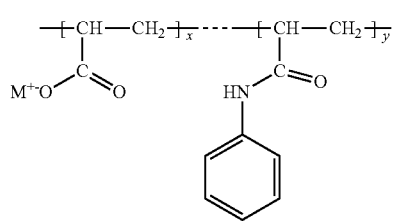
C
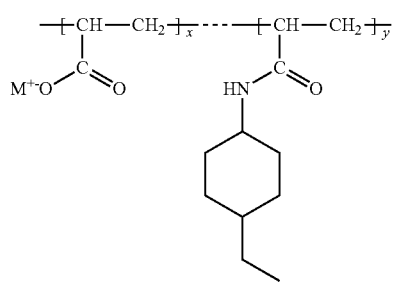
D
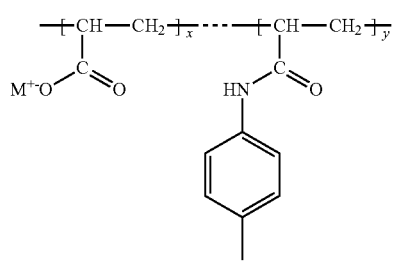
E
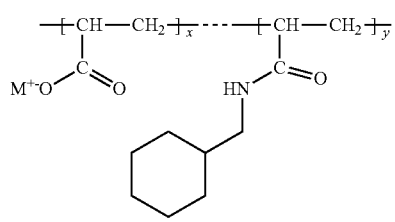
F
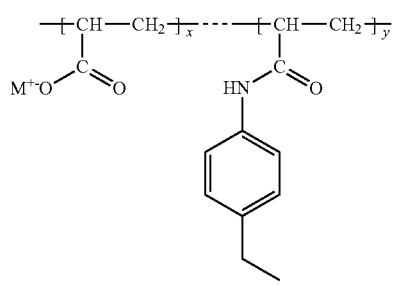
G
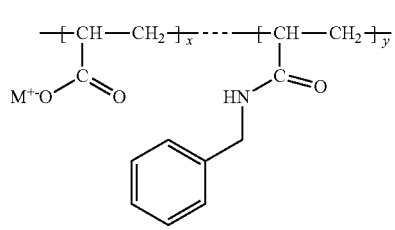
H
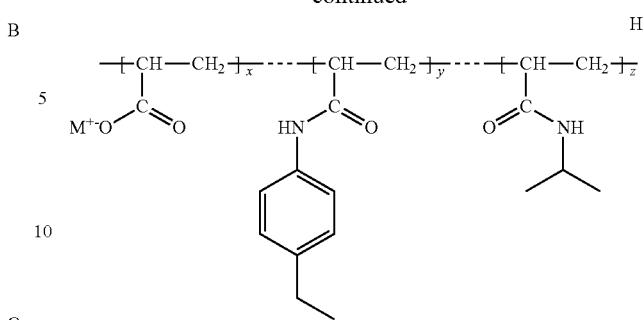
I
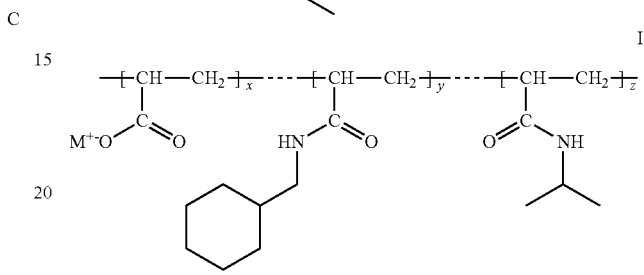
J
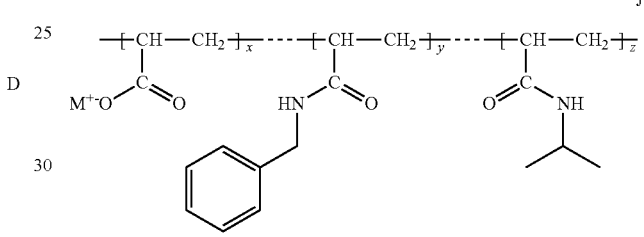
K
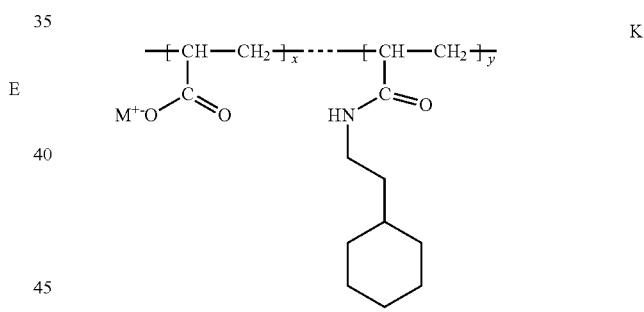
L
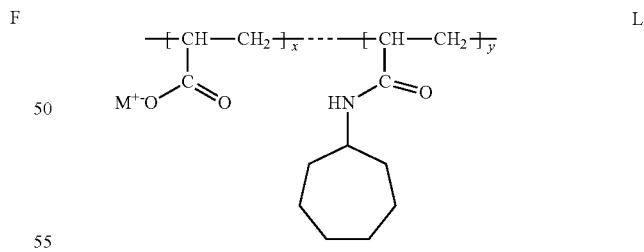
M
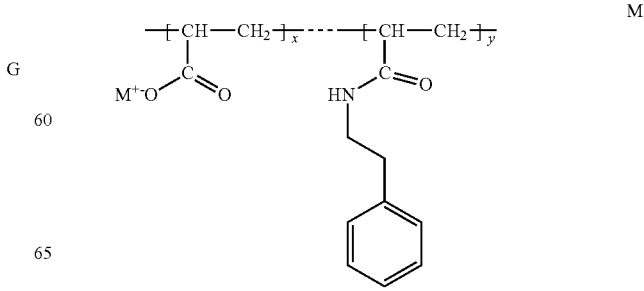

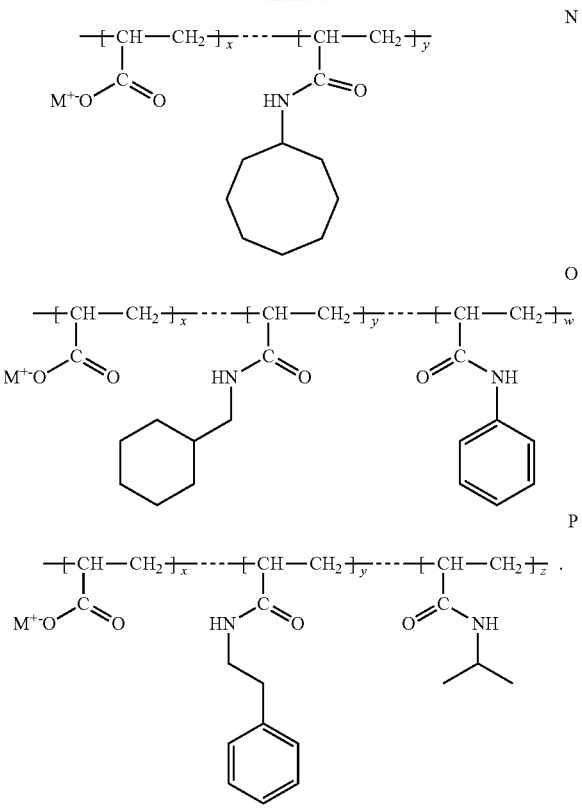

10. The water-soluble membrane protein-amphiphilic vinyl polymer complex according to claim 1, wherein the amphiphilic vinyl polymer of formula I is functionalized by grafting an affinity tag, a fluorescent probe, or an immunostimulatory molecule.

11. The water-soluble membrane protein-amphiphilic vinyl polymer complex according to claim 1, further comprising lipid compounds.

12. The water-soluble membrane protein-amphiphilic vinyl polymer complex according to claim 1, wherein M+ is selected from $Li^+$, $Na^+$, $K^+$.

13. The water-soluble membrane protein-amphiphilic vinyl polymer complex according to claim 1, said phenyl being para substituted with a methyl or ethyl group.

14. An aqueous solution comprising the complex according to claim 1, comprising a mixture of membrane proteins, including at least one stabilized membrane protein.

15. A process of preparing the solution according to claim 14, comprising a solubilization and/or stabilization step in which a protein fraction from a biological or synthetic membrane containing a said membrane protein, or said mixture of membrane proteins, is brought into the presence of said vinyl polymer of formula I.

16. The process of preparing the solution according to claim 15, wherein said membrane protein, or said mixture of membrane proteins, is/are selected from among: one or more recombinant proteins expressed in prokaryotic or eukaryotic cells, one or more native proteins expressed in specialized membranes with high protein density, and a mixture thereof.

17. The process of preparing the solution according to claim 16, comprising first solubilizing said membrane protein, or said mixture of membrane proteins, by bringing the membrane protein fraction or the mixture of membrane proteins together with a detergent medium.

18. The process of preparing the solution according to claim 16, comprising first fusing the protein fraction containing a said membrane protein, or said mixture of membrane proteins, with vesicles of phospholipids or of a mixture of phospholipids.

19. The water process of preparing the solution according to claim 18, said vesicles comprising 1,2-dimyristoyl-sn-glycero-3-phosphocholine (DMPC).

20. The process of preparing the solution according to claim 16, wherein the protein fraction containing said membrane protein is not a solution of membrane protein(s) in a detergent medium in micellar form.

21. A polymer of formula I:

Formula I

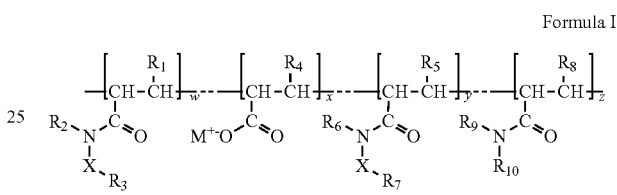

wherein:

$M^+$ is an alkali metal, with w, x, y, z corresponding to the respective percentages of the units,
 with x being between 20 and 90%,
 with y being between 10 and 80%,
 with w being 0%, and
 with z being between 0 and 60%, provided that w+x+y+z=100%%, $R_4$, $R_5$, $R_8$ are each independently a hydrogen atom or a methyl radical, $R_6$, $R_9$ are each independently a group selected from a hydrogen atom, linear (C1-C8) alkyls, and branched (C3-C8) alkyls, $R_{10}$ is a group selected from linear (C1-C5) alkyls and branched (C3-C5) alkyls, R7 is a group selected from the group consisting of:
 (C3-C10) cycloalkyls or (C3-C10) (hetero) cycloalkyls, unsubstituted or substituted by one or more radicals selected from linear, cyclic or branched (C1-C8) alkyls, linear or branched (C2-C8) alkenyls, and linear or branched (C2-C8) alkynyls, and
 phenyl, substituted by one or more radicals selected from linear, cyclic or branched (C1-C8) alkyls, linear or branched (C2-C8) alkenyls, and linear or branched (C2-C8) alkynyls, and wherein X is selected from a single bond, linear (C2-C8) alkylenes, branched (C3-C8) alkylenes, linear (C2-C8) alkenylenes, branched (C3-C8) alkenylenes, linear (C2-C8) alkylenes, and branched (C3-C8) alkynylenes.

* * * * *